US012133595B2

(12) United States Patent
Liu

(10) Patent No.: US 12,133,595 B2
(45) Date of Patent: Nov. 5, 2024

(54) INFLATING PUMP

(71) Applicant: CAREMED SUPPLY INC., New Taipei (TW)

(72) Inventor: Tsung-Hsuan Liu, Taipei (TW)

(73) Assignee: CAREMED SUPPLY INC., New Taipei (TW)

( * ) Notice: Subject to any disclaimer, the term of this patent is extended or adjusted under 35 U.S.C. 154(b) by 373 days.

(21) Appl. No.: 17/825,426

(22) Filed: May 26, 2022

(65) Prior Publication Data

US 2023/0404281 A1 Dec. 21, 2023

(51) Int. Cl.
*A47C 27/08* (2006.01)
*A61G 7/057* (2006.01)
*F04D 29/46* (2006.01)
*F04D 29/50* (2006.01)

(52) U.S. Cl.
CPC ........ *A47C 27/082* (2013.01); *A61G 7/05769* (2013.01); *F04D 29/462* (2013.01); *A47C 27/08* (2013.01); *A47C 27/081* (2013.01); *A61G 7/05776* (2013.01); *F04D 29/503* (2013.01)

(58) Field of Classification Search
CPC ... A47C 27/082; A47C 27/081; A47C 27/083; A47C 27/10; A61G 7/05769; A61G 7/05776; A61G 7/05784; A61H 2201/0103; A61H 2201/0146; A61M 16/0066; F04B 49/22; F04B 33/00; F04B 49/007; F04D 29/462; F04D 29/503; F04D 27/0215; F04D 29/42; Y10T 137/86638
USPC .......................................................... 137/876
See application file for complete search history.

(56) References Cited

U.S. PATENT DOCUMENTS

| | | | | |
|---|---|---|---|---|
| 6,253,402 B1 * | 7/2001 | Lin | ........................ | F16K 11/074 137/625.21 |
| 6,266,833 B1 * | 7/2001 | Lin | ........................ | A61G 7/001 137/625.21 |
| 2003/0183287 A1 * | 10/2003 | Wu | ........................ | F04D 25/084 137/625.21 |
| 2018/0289174 A1 * | 10/2018 | Ye | ........................ | A47C 21/006 |

* cited by examiner

*Primary Examiner* — David R Hare
*Assistant Examiner* — Deborah Talitha Gedeon
(74) *Attorney, Agent, or Firm* — Rabin & Berdo, P.C.

(57) ABSTRACT

An inflating pump includes an enclosure having an exterior shell and an enclosing wall located in the exterior shell and enclosing an airflow passage, and a discharge space formed between the exterior shell and the enclosing wall; an air blower connected to the enclosing wall; two air delivery pipes; and an airflow switching mechanism including a fixed seat having a plurality of chambers separately communicable with the airflow passage, the discharge space, the air blower and the two air delivery pipe, and a turnable member being turnable relative to the fixed seat for some of the chambers to communicate with one another to allow airflow pushed out from the air blower to flow through the airflow passage, the discharge space or the two air delivery pipes. Therefore, the inflating pump can inflate and deflate an inflatable air bed when the air blower constantly produces airflow in the same direction.

7 Claims, 28 Drawing Sheets

INFLATING PUMP

FIELD OF THE INVENTION

The present invention relates to an inflating pump for inflating an inflatable air bed, and more particularly, to an inflating pump that can change the flowing direction of airflow, so as to inflate or deflate different areas of the inflatable air bed according to a user's actual need.

BACKGROUND OF THE INVENTION

There are patients who could not move by themselves owing to paralysis, persistent vegetative state, stroke, or spinal injury. These immovable patients have to lie on sickbed and always maintain in the same posture for a long time, which would lead to local skin pressure and accordingly, cause blistered and scraped skin to the patients. In some worse condition, the local skin of the patient under a long term pressure would lead to bedsore and finally result in tissue necrosis.

To reduce the chance of immovable patients to get bedsore, healthcare providers have to massage and roll over the patients from time to time to prevent their local skin from necrosis. Following the progress of technology and science in the modern society, the medical device industry has developed inflatable air beds and inflating pumps for the immovable patients. The inflatable air bed can be inflated and deflated intermittently with the inflating pump. In the course of being inflated and deflated intermittently, the inflatable air bed massages and relaxes the patient's muscles and enhances the patient's blood circulation in body. However, since the conventional inflating pumps could not change the flowing direction of the airflow, they could not partially inflate and deflate the inflatable air bed according to the patient's body areas that require massage. Therefore, the conventional inflating pumps do not provide high utility.

SUMMARY OF THE INVENTION

A primary object of the present invention is to provide an inflating pump with an improved structural configuration, so that airflow supplied from an air blower of the improved inflating pump can be changed in flowing direction to selectively inflate different areas of an inflatable air bed or be discharged to an external environment. Therefore, when the improved inflating pump constantly produces airflow in the same flow direction, it can inflate the entire inflatable air bed, partially inflate and deflate different areas of the inflatable air bed, or deflate the entire inflatable air bed to provide increased utility.

To achieve the above and other objects, the inflating pump according to the present invention is used to inflate and deflate an inflatable air bed having a first and a second air bag, and includes an enclosure, an airflow switching mechanism, an air blower and an air delivery pipe assembly.

The enclosure includes an exterior shell and an enclosing wall located in the exterior shell; the exterior shell internally defines a hollow space, and a discharge space is formed between. The exterior shell and the enclosing wall; and an airflow passage is formed inside the enclosing wall.

The airflow switching mechanism is located in the enclosure and includes a fixed seat and a turnable member. The fixed seat has an air-in passage, a first air delivery chamber, a second air delivery chamber, a discharge chamber and a passage chamber, which are not communicable with one another. The discharge chamber is communicable with the discharge space; and the passage chamber is communicable with the airflow passage. The turnable member is pivotally connected to the fixed seat and has a first outward guiding recess and a second outward guiding recess that are not communicable with each other. The first outward guiding recess is communicable with the air-in passage and can be selectively aligned with at least one of the first air delivery chamber, the second air delivery chamber, the discharge chamber and the passage chamber. The second outward guiding recess is aligned with remaining ones of the first air delivery chamber, the second air delivery chamber, the discharge chamber and the passage chamber that are not aligned with the first outward guiding recess.

The air blower is connected to between the enclosing wall and the air-in passage for pushing out airflow into the air-in passage. The air delivery pipe assembly includes a first air delivery pipe for connecting to the first air bag and a second air delivery pipe for connecting to the second air bag. The first air delivery pipe is communicable with the first air delivery chamber, and the second air delivery pipe is communicable with the second air delivery chamber.

In a preferred embodiment, the turnable member is turnable relative to the fixed seat for the airflow to selectively flow from the air-in passage into at least one of the first air delivery chamber, the second air delivery chamber, the discharge chamber and the passage chamber, such that the inflating pump can be switched among a full inflation mode, a partial inflation mode and a deflation mode.

In the full inflation mode, the first outward guiding recess is communicable with the first air delivery chamber and the second air delivery chamber while the second outward guiding recess is communicable with the discharge chamber and the passage chamber, such that the airflow supplied from the air blower flows through the first air delivery pipe and the second air delivery pipe into the first air bag and the second air bag, respectively.

In the partial inflation mode, the first outward guiding recess is communicable with the first air delivery chamber while the second outward guiding recess is communicable with the second air delivery chamber, the discharge chamber and the passage chamber, such that the airflow supplied from the air blower can flow through the first air delivery pipe into the first air bag.

In the deflation mode, the first outward guiding recess is communicable with the discharge chamber while the second outward guiding recess is communicable with the first air delivery chamber, the second air delivery chamber and the passage chamber, such that the airflow supplied from the air blower flows to the discharge space and the air in the first and the second bag flows through the airflow passage into the air blower.

According to the preferred embodiment, when the inflating pump is in the partial inflation mode, the air in the second air bag can flow through the second air delivery pipe into the airflow passage, and the airflow flows from the second air bag to the airflow passage can further flow into the air blower.

The airflow switching mechanism further includes a locating unit provided between the fixed seat and the turnable member for the turnable member to stay at different positions relative to the fixed seat, such that the inflating pump can be set to one of the full inflation mode, the partial inflation mode and the deflation mode. The locating unit includes a locating protrusion provided on one of the fixed seat and the turnable member and a plurality of locating notches provided on the other one of the fixed seat and the turnable member; and the locating protrusion is detachably engaged with one of the locating notches.

The fixed seat further includes a fixed air-in pipe formed around the air-in passage, and a plurality of fixed air-out partitions circumferentially spaced on the fixed air-in pipe. Any two adjacent ones of the first air delivery chamber, the second air delivery chamber, the discharge chamber, and the passage chamber have one of the fixed air-out partitions located between them. The fixed air-in pipe and the fixed air-out partitions together prevent the airflow from flowing from the air-in passage directly into any one of the first air delivery chamber, the second air delivery chamber, the discharge chamber and the passage chamber.

The turnable member further includes a turnable partition located between the first outward guiding recess and the second outward guiding recess for preventing the airflow from flowing from the first outward guiding recess into the second outward guiding recess. The turnable partition includes an air-in partition section aligned with the fixed air-in pipe and two air-out partition sections oppositely extended from the air-in partition section. When the inflating pump is switched to one of the full inflation mode, the partial inflation mode and the deflation mode, each of the air-out partition sections is aligned with one of the fixed air-out partitions in a one-to-one correspondence.

According to the preferred embodiment, the airflow pushed out from the air blower can only flow into the air-in passage.

The present invention is characterized in that the turnable member is internally divided into the first outward guiding recess and the second outward guiding recess by the turnable partition, such that when the turnable member is turned relative to the fixed seat, the first outward guiding recess can selectively communicate with at least one of the first air delivery chamber, the second air delivery chamber, the discharge chamber and the passage chamber, while the second outward guiding recess is aligned with remaining ones of the first air delivery chamber, the second air delivery chamber, the discharge chamber and the passage chamber that are not communicable with the first outward guiding recess, and the airflow supplied from the air blower can flow into the airflow passage, the discharge space, the first air delivery pipe or the second air delivery pipe. With these arrangements, the inflating pump can be switched among the full inflation mode, the partial inflation mode and the deflation mode. Therefore, when the air blower constantly produces airflow in the same flowing direction, the inflating pump can inflate the entire inflatable air bed, or partially inflate and deflate different areas of the inflatable air bed at the same time, or deflate the entire inflatable air bed to effectively provide increased utility.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

The present invention will now be described with a preferred embodiment thereof and by referring to the accompanying drawings.

Figure 1:
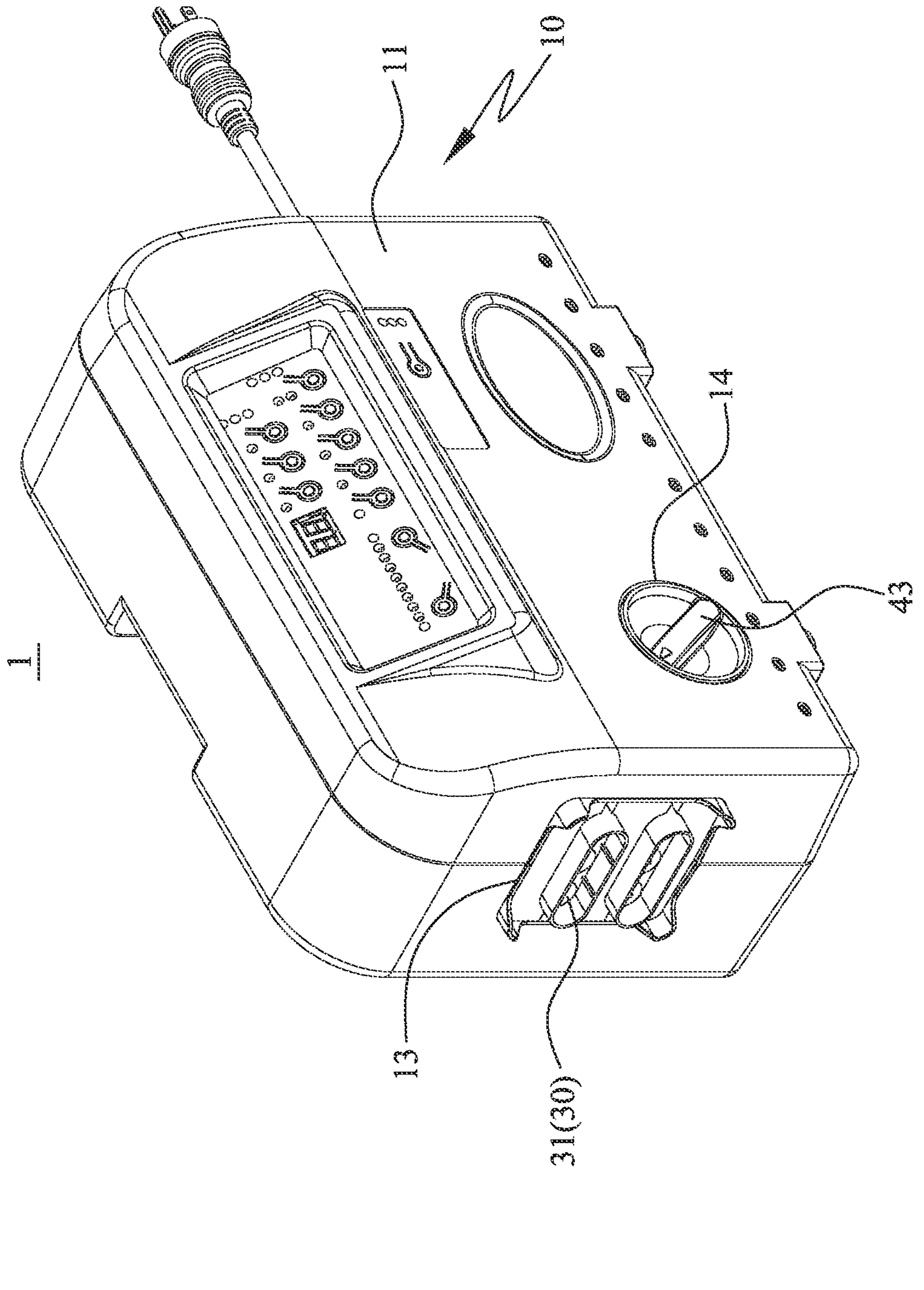
FIG. 1 is a perspective view of an inflating pump according to a preferred embodiment of the present invention.
Figure 2:
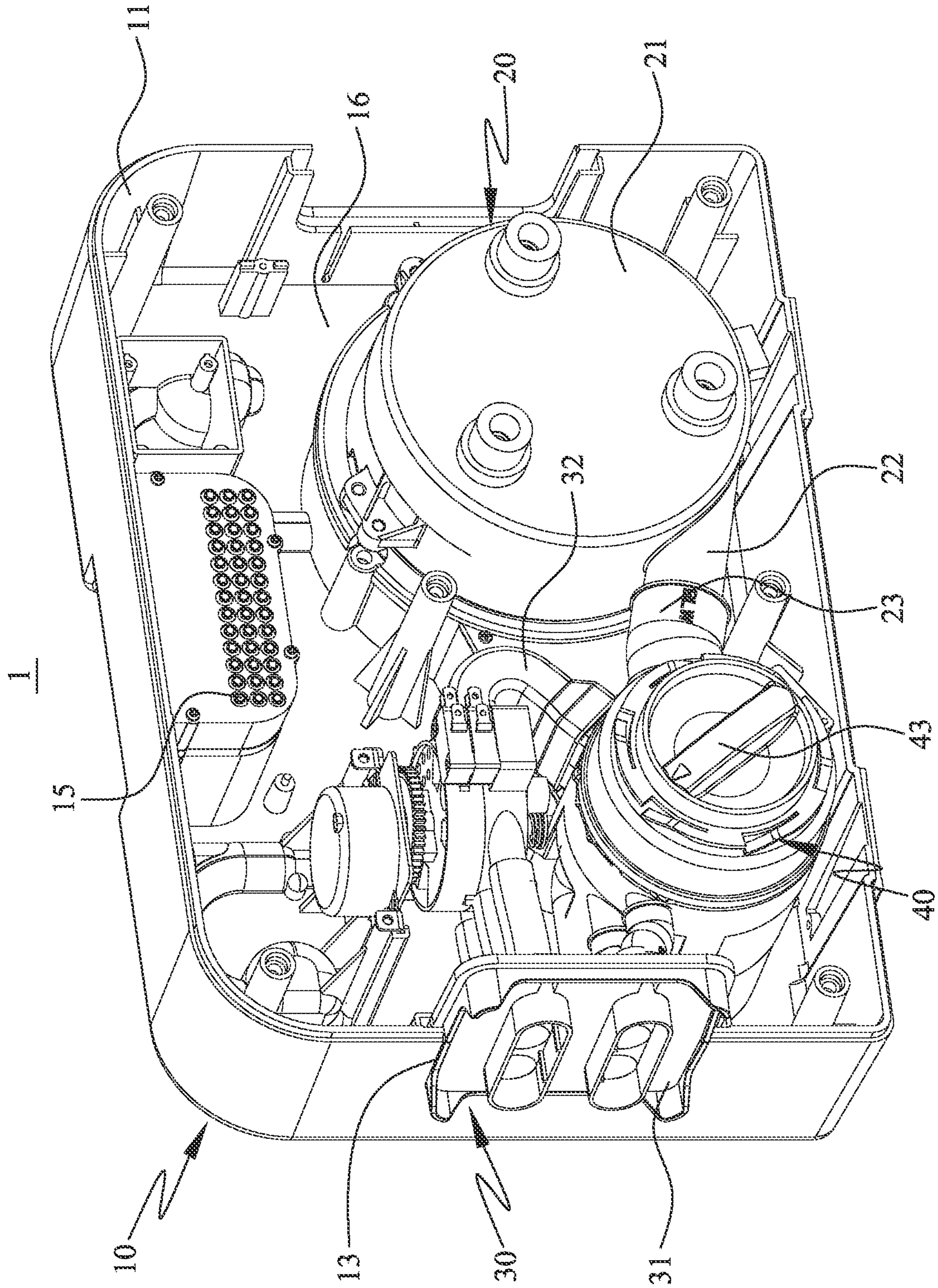
FIG. 2 shows an internal structure of the inflating pump of FIG. 1.
Figure 3:
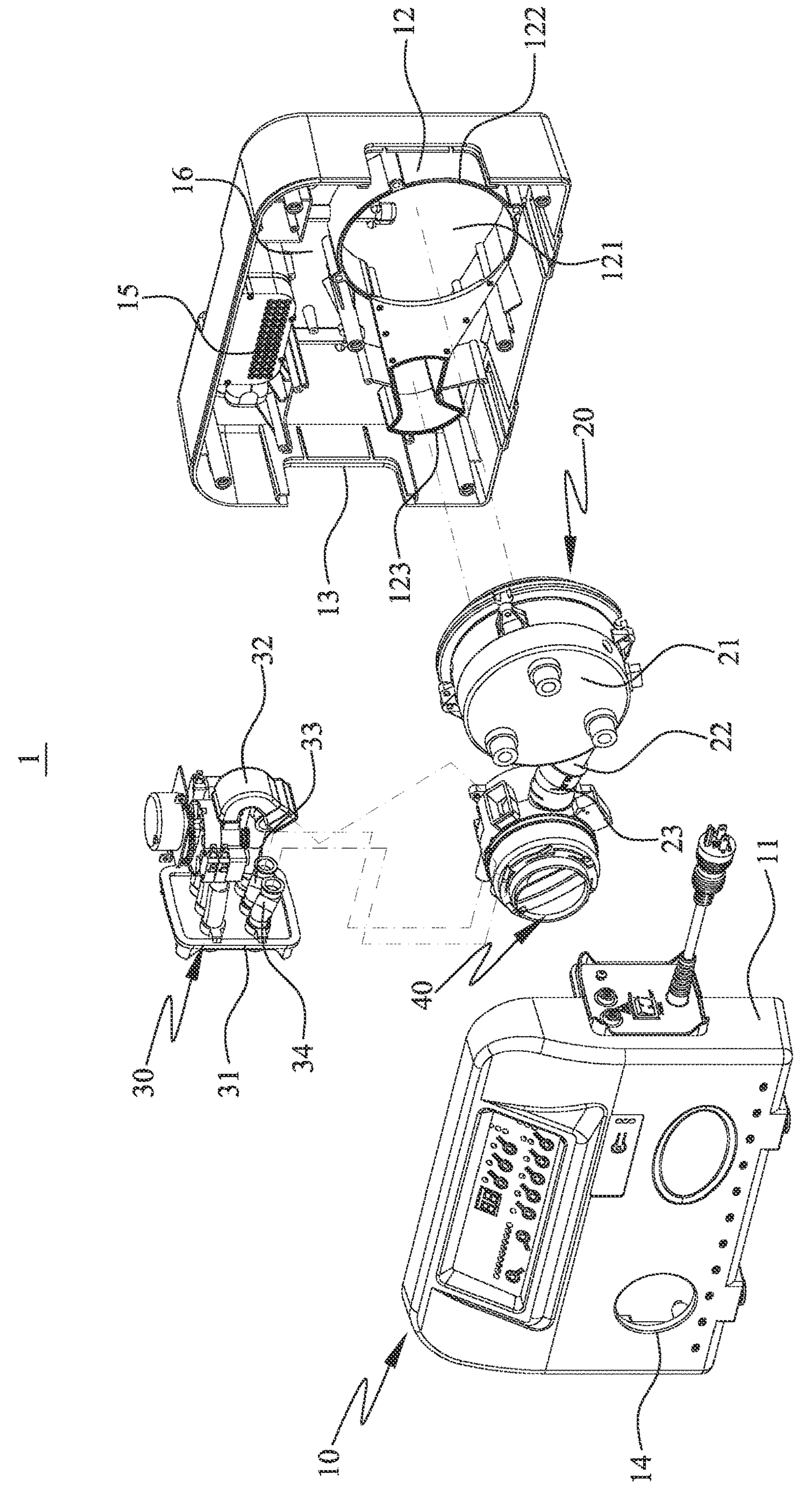
FIG. 3 is an exploded perspective view of the inflating pump of FIG. 1.
Figure 4A:
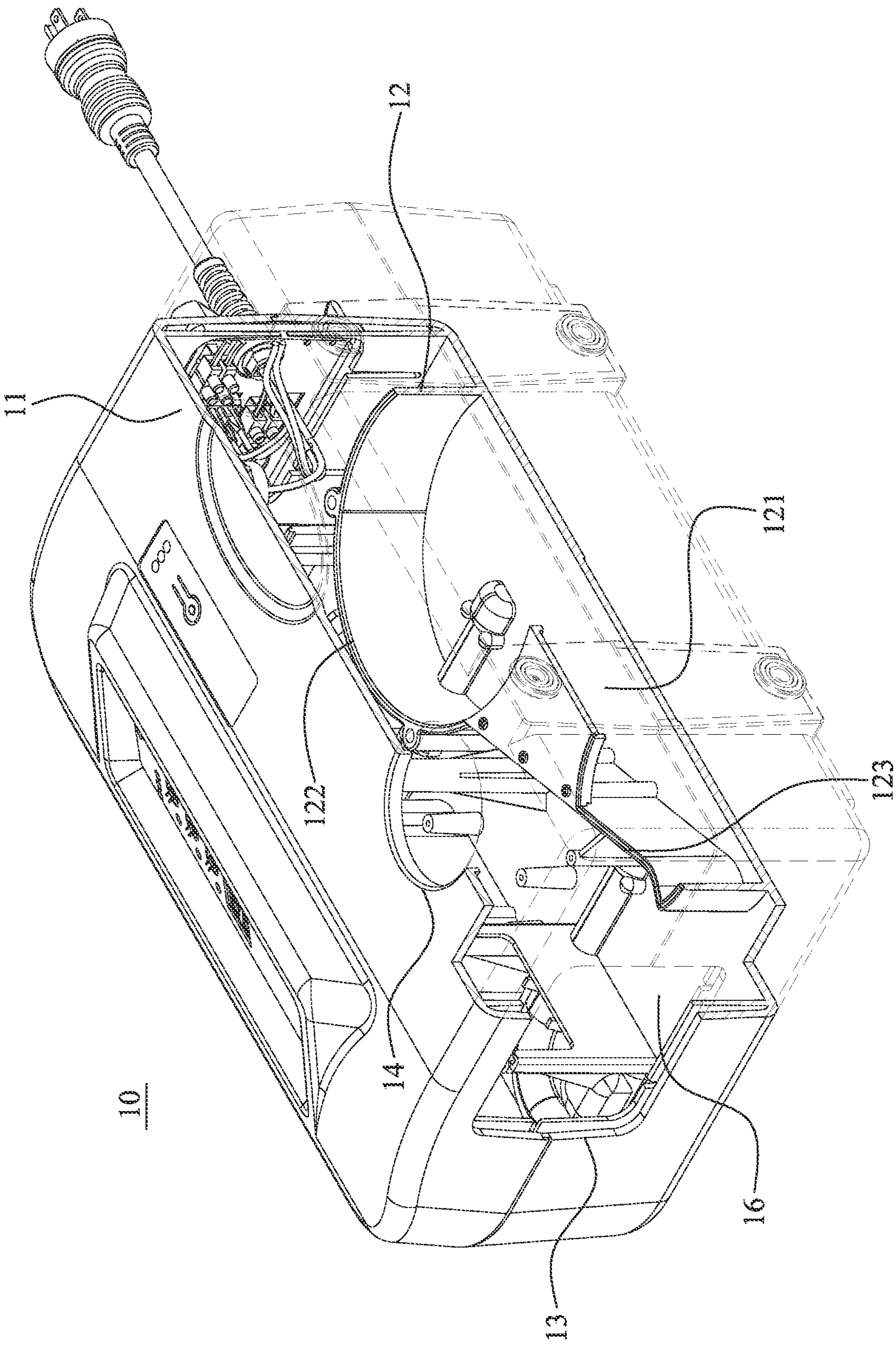
FIG. 4A is a partially phantom, cutaway view of an enclosure of the inflating pump of FIG. 1.
Figure 4B:
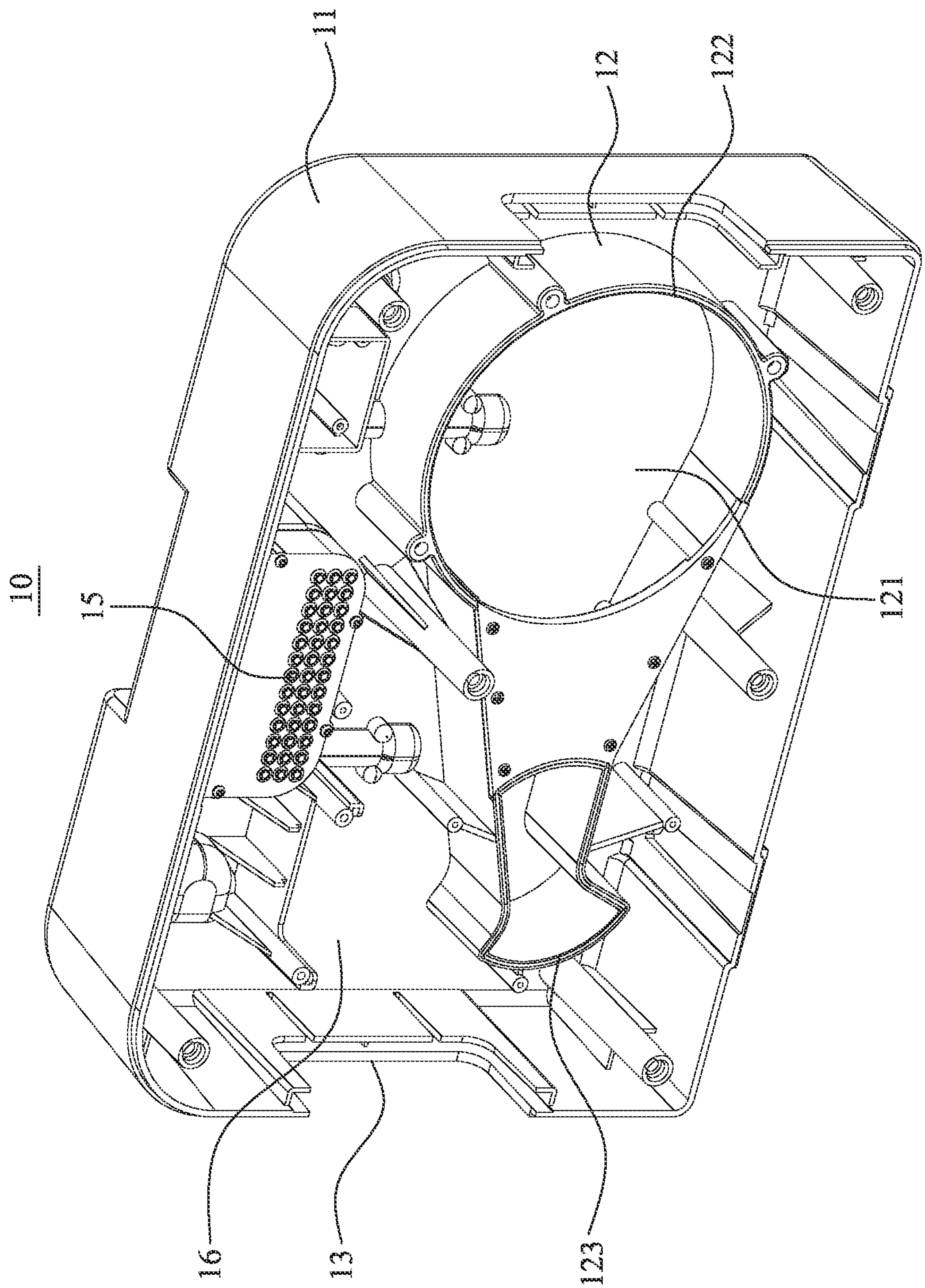
FIG. 4B shows an internal structure of the enclosure of FIG. 4A.

Please refer to FIGS. 1 to 3. An inflating pump 1 according to the present invention includes an enclosure 10, an air blower 20, an air delivery pipe assembly 30, and an airflow switching mechanism 40. Please refer to FIGS. 3, 4A and 4B. The enclosure 10 includes an exterior shell 11, which internally defines a hollow space and is provided at different locations with an enclosing wall 12, a connection mounting opening 13, a knob mounting opening 14, and a plurality of communicating holes 15. The enclosing wall 12 is located in the exterior shell 11 and encloses an airflow passage 121 therein. The enclosing wall 12 has two communicable opposite ends to form a first mounting opening 122 and a second mounting opening 123, which are communicable with the airflow passage 121 and spaced from each other. As shown, a discharge space 16 is provided in the enclosure 10 between the exterior shell 11 and the enclosing wall 12, and the discharge space 16 is communicable with the airflow passage 121 via the first and the second mounting opening 122, 123. The connection mounting opening 13, the knob mounting opening 14 and the communicating holes 15 are separately provided at different side surfaces of the exterior shell 11 and all are communicable with the discharge space 16. In the illustrated preferred embodiment, the communicating holes 15 are communicable with an external environment outside the exterior shell 11, and the discharge space 16 communicates with the external environment via the communicating holes 15.

Please refer to FIGS. 2 and 3. The air blower 20 is located in the discharge space 16 of the enclosure 10, and includes a blower main body 21 having blades mounted therein and an air-out connection 22 extended from the blower main body 21. When the blades rotate, airflow A (see FIG. 9C) is pushed out from the blower main body 21 and flows toward the air-out connection 22. The blower main body 21 is mounted to the first mounting opening 122 of the enclosing wall 12 to also cover the entire first mounting opening 122. The air-out connection 22 has an air-out pipe 23 mounted thereto for connecting to the air delivery pipe assembly 30.

Figure 5:
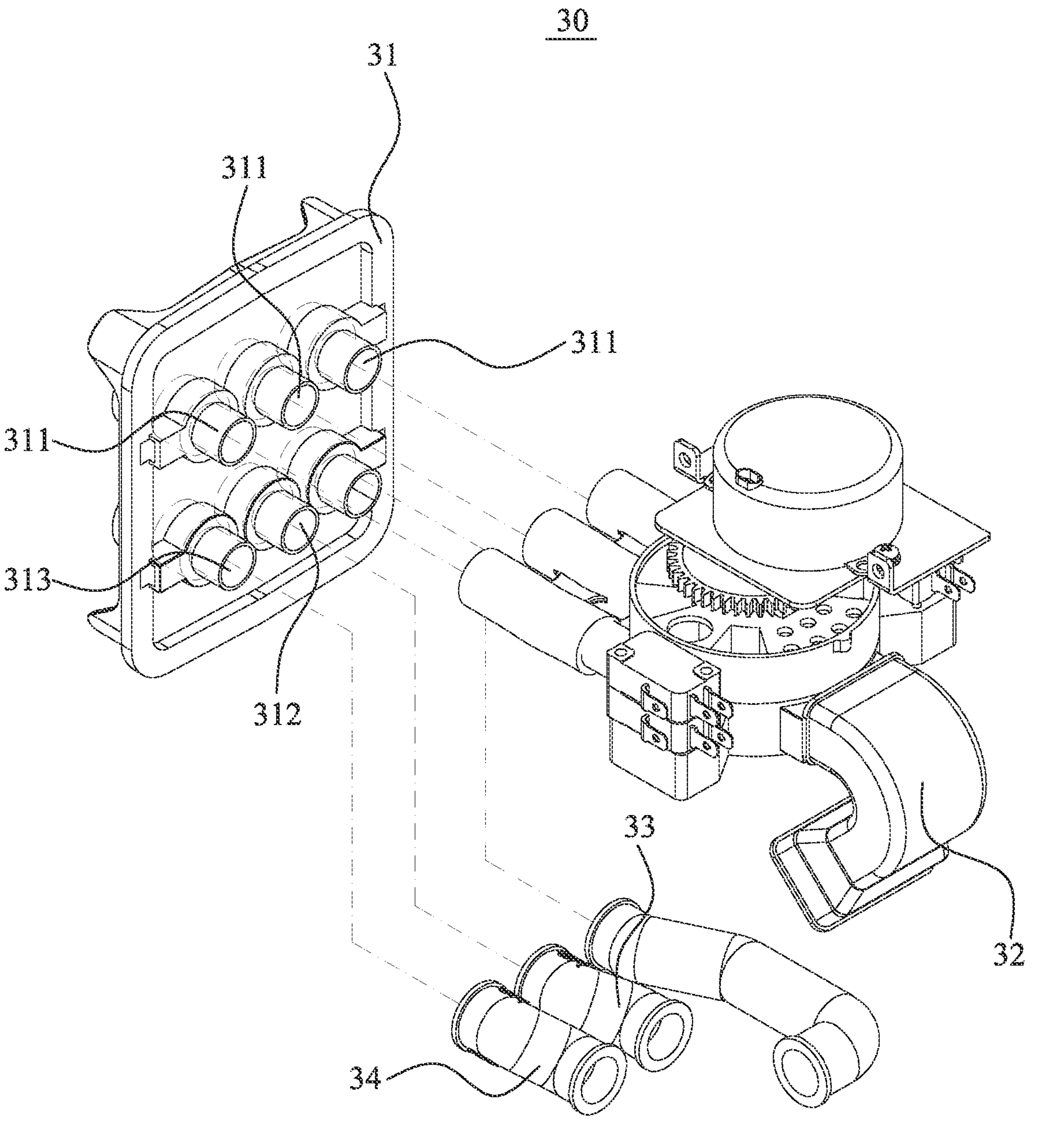
FIG. 5 is an exploded perspective view of an air delivery pipe assembly for the inflating pump of the present invention.

Please refer to FIGS. 3 and 5. The air delivery pipe assembly 30 is located in the discharge space 16 of the enclosure 10, and includes an air delivery connection 31, a first air delivery pipe 32, a second air delivery pipe 33, and a third air delivery pipe 34. The air delivery connection 31 covers the connection mounting opening 13 of the enclosure 10; and the blower main body 21 is connected to the exterior shell 11 of the enclosure 10. The air delivery connection 31 is provided with a plurality of first air delivery ports 311, a second air delivery port 312, and a third air delivery port 313. The first air delivery pipe 32 is communicably connected to all the first air delivery ports 311 at the same time; while the second and the third air delivery pipe 33, 34 are connected to the second and the third air delivery port 312, 313, respectively.

As shown in FIGS. 2 and 3, the airflow switching mechanism 40 is located in the discharge space 16 of the enclosure 10, and is connected to and located among the enclosing wall 12, the air blower 20 and the air delivery pipe assembly 30. As can be seen in FIGS. 3 and 6A to 6C, the airflow switching mechanism 40 includes a fixed seat 41, a turnable member 42, a turning knob 43, and a locating unit 44. The fixed seat 41 is located at one end of the enclosing wall 12 forming the second mounting opening 123 and is connected to the exterior shell 11 of the enclosure 10 to be aligned with the second mounting opening 123. As shown, the fixed seat 41 includes a fixed shell 411 in the form of a hollow cylindrical body and a fixed air-in pipe 412 extending into the fixed shell 411. A part of the fixed air-in pipe 412 is integrally formed with the fixed shell 411 and is defined as a first fixed air-in section 412*a*, and the remaining part of the fixed air-in pipe 412 is located in the fixed shell 411 and is defined as a second fixed air-in section 412*b*. The second fixed air-in section 412*b* is located perpendicular to the first fixed air-in section 412*a*. As shown, the first fixed air-in section 412*a* is connected to the air-out pipe 23 of the air blower 20; and the first and the second fixed air-in section 412*a*, 412*b* together internally define an air-in passage 412*c*. Further, in the second fixed air-in section 412*b* of the fixed seat 41, there is provided with a fixed pivotal connecting stem 413; and a plurality of circumferentially spaced fixed air-out partitions 414 is provided on the fixed seat 41 between the fixed shell 411 and the second fixed air-in section 412*b* to define an air chamber 415 between any two adjacent fixed air-out partitions 414. As shown, in the illustrated preferred embodiment, the fixed air-out partitions 414 include a first, a second, a third, a fourth, a fifth, a sixth, and a seventh fixed air-out partition 414*a*, 414*b*, 414*c*, 414*d*, 414*e*, 414*f*, 414*g*; they are sequentially, counterclockwise, and circumferentially spaced on an outer periphery of the second fixed air-in section 412*b*, such that a first air delivery chamber 415*a* is formed between the first and the second fixed air-out partition 414*a*, 414*b* to connect with the first air delivery pipe 32 of the air delivery pipe assembly 30; a second air delivery chamber 415*b* is formed between the second and the third fixed air-out partition 414*b*, 414*c* to connect with the second air delivery pipe 33 of the air delivery pipe assembly 30; a third air delivery chamber 415*c* is formed between the third and the fourth fixed air-out partition 414*c*, 414*d* to connect with the third air delivery pipe 34 of the air delivery pipe assembly 30; a passage chamber 415*d* is formed between the fourth and the fifth fixed air-out partition 414*d*, 414*e* to communicate with the airflow passage 121 of the enclosure 10; and a discharge chamber 415*e* is formed between the fifth and the sixth fixed air-out partition 414*e*, 414*f* to communicate with the discharge space 16 of the enclosure 10. The seventh fixed air-out partition 414*g* is located between the first and the sixth fixed air-out partition 414*a*, 414*f* and is integrally formed with the first fixed air-in section 412*a*. In the illustrated preferred embodiment, the fixed air-in pipe 412 and the first to the seventh fixed air-out partition 414*a*~414*g* are designed to prevent airflow A (see FIG. 9C) from flowing from the air-in passage 412*c* directly to the first air delivery chamber 415*a*, the second air delivery chamber 415*b*, the third air delivery chamber 415*c*, the passage chamber 415*d* or the discharge chamber 415*e*, so that these five chambers are not directly communicable with one another.

Figure 6A:
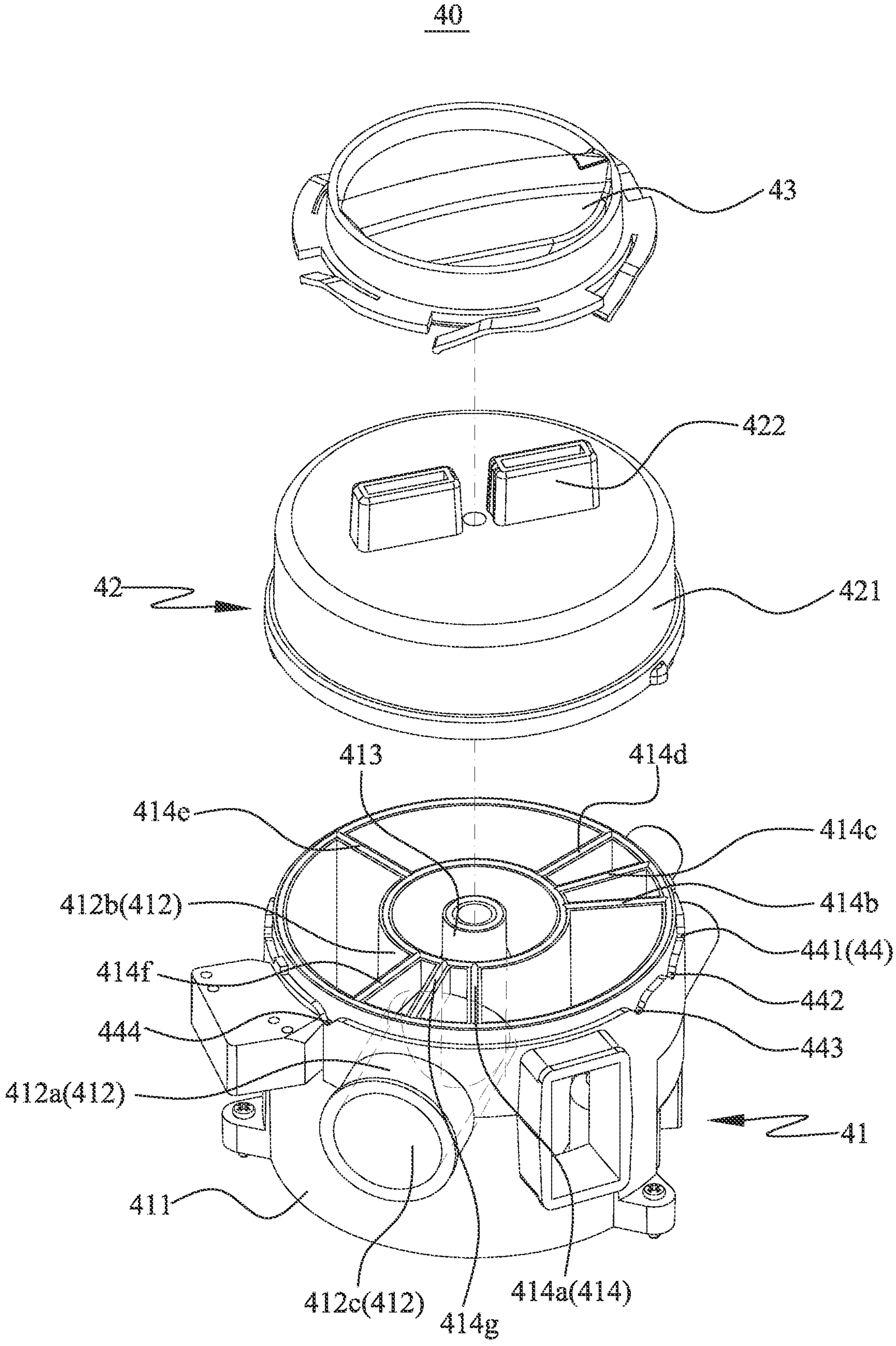
FIG. 6A is an exploded perspective view of an airflow switching mechanism for the inflating pump of the present invention.
Figure 6B:
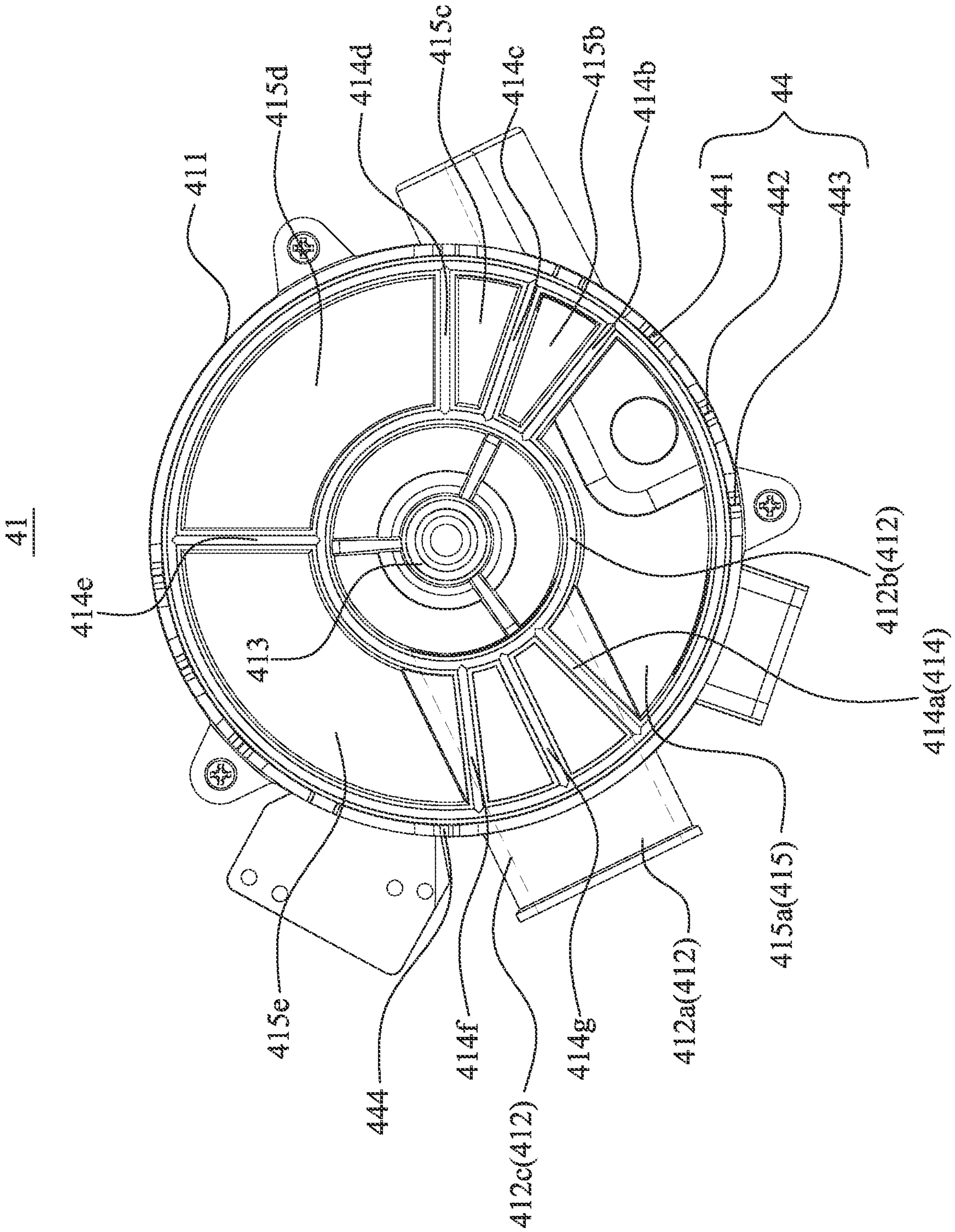
FIG. 6B is a side view of a fixed seat of the airflow switching mechanism.
Figure 6C:
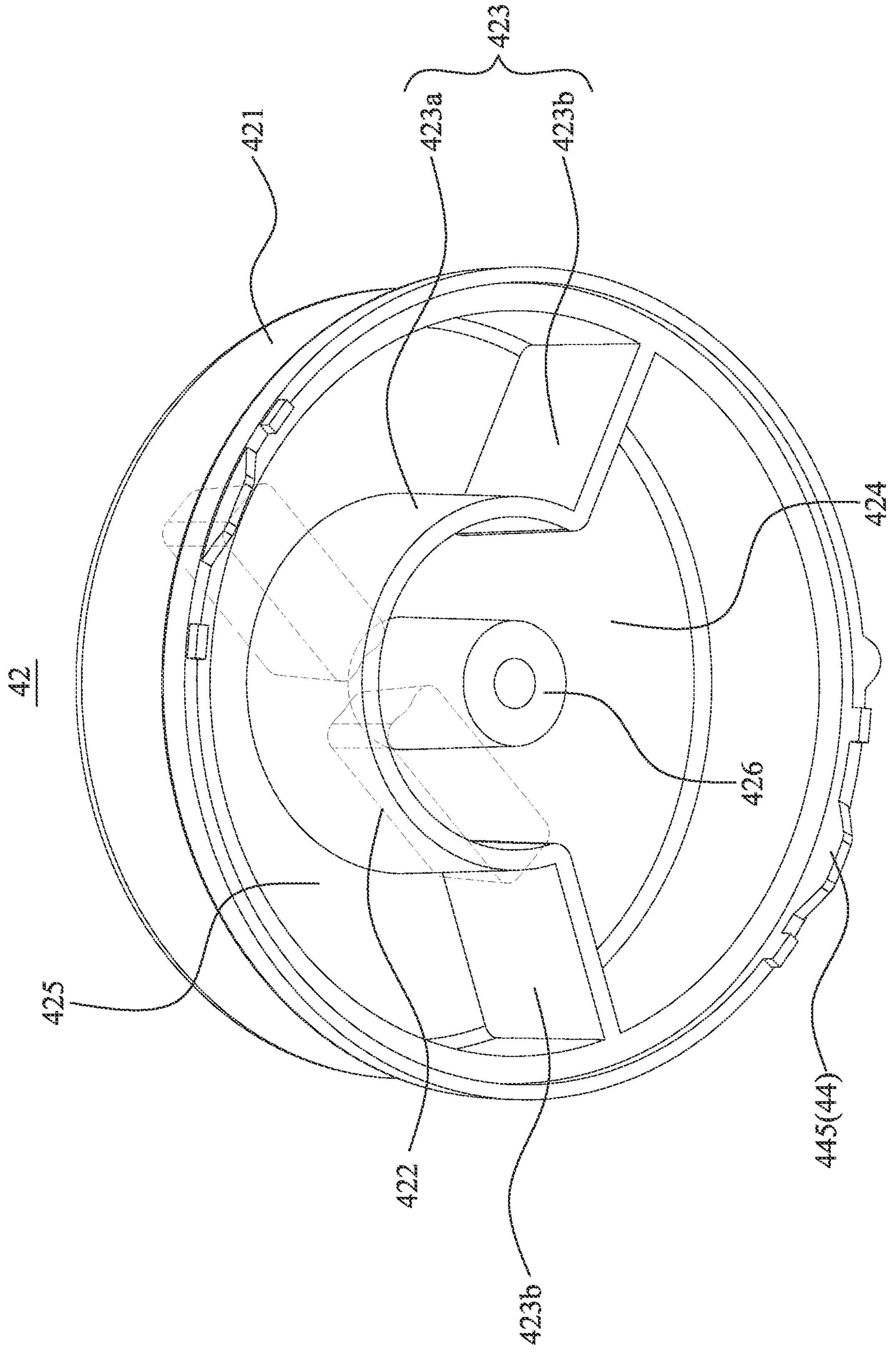
FIG. 6C is a bottom perspective view of a turnable member of the airflow switching mechanism.
Figure 6D:
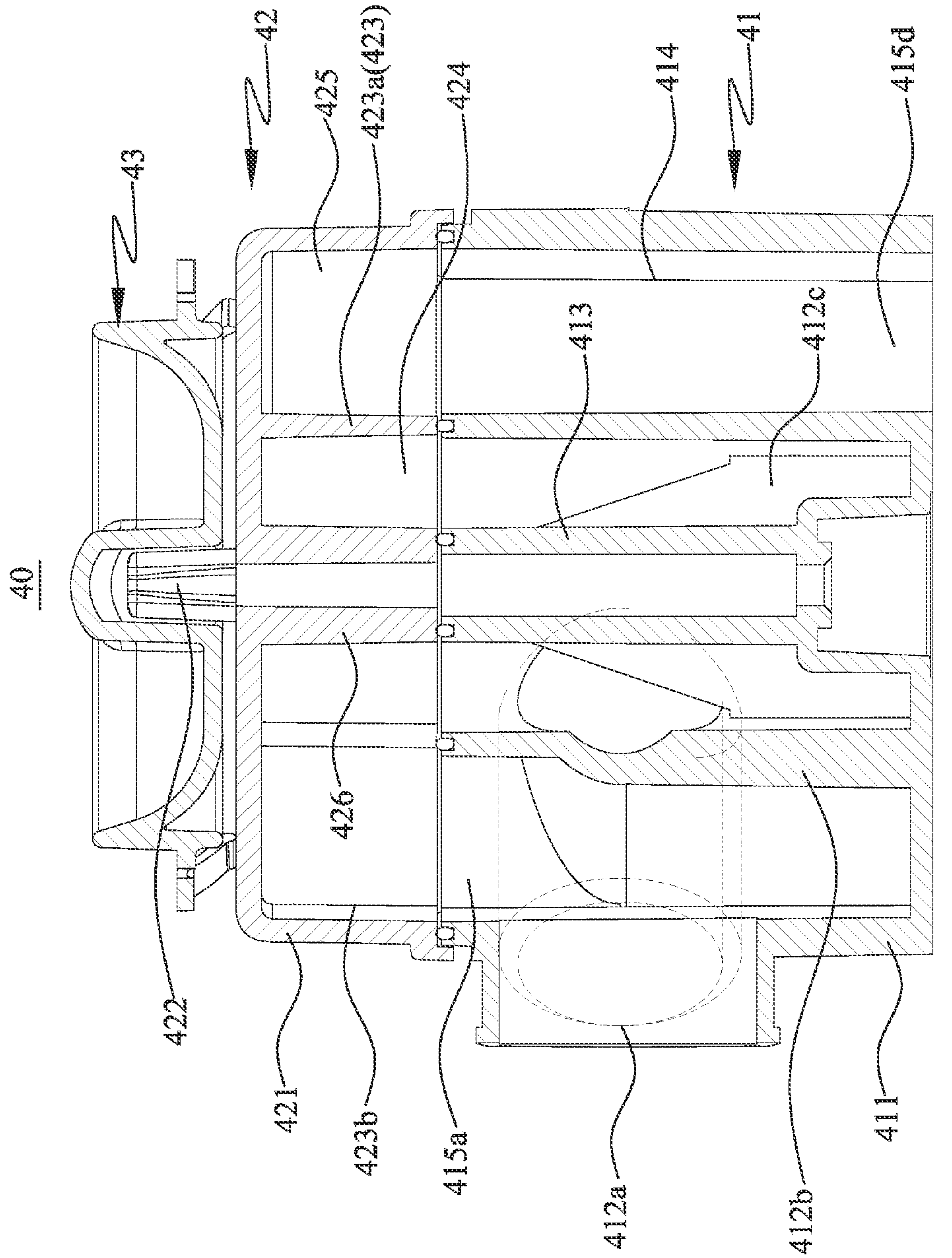
FIG. 6D is an assembled sectional view of the airflow switching mechanism.

The turnable member 42 of the airflow switching mechanism 40 includes a hollow cylindrical turnable shell 421, a knob coupling block 422 provided on an outer side of the turnable shell 421, and a turnable partition 423 provided in an inner side of the turnable shell 421 to divide the inner side of the turnable shell 421 into a first outward guiding recess 424 and a second outward guiding recess 425. The turnable partition 423 is designed to prevent airflow A (see FIG. 9C) from flowing from the first outward guiding recess 424 directly to the second outward guiding recess 425, so that the first and the second outward guiding recess 424, 425 are not communicable with each other. As shown, the turnable partition 423 includes a curved air-in partition section 423*a* and two straight air-out partition sections 423*b* separately extended from two opposite ends of the curved air-in partition section 423*a*. In the first outward guiding recess 424, there is a turnable pivotal connecting stem 426 located near the air-in partition section 423*a*. Please refer to FIG. 6D. The turnable pivotal connection stem 424 is pivotally connected to the fixed pivotal connection stem 413 on the fixed seat 41, such that the turnable shell 421 covers the air-in passage 412*c*, the first air delivery chamber 415*a*, the second air delivery chamber 415*b*, the third air delivery chamber 415*c*, the passage chamber 415*d*, or the discharge chamber 415*e* of the fixed seat 41, and the air-in partition section 423*a* of the turnable partition 423 is aligned with the second fixed air-in section 412*b* of the fixed air-in pipe 412 to allow communication of the first outward guiding recess 424 with the air-in passage 412*c*. The first outward guiding recess 424 can also be aligned with at least one of the first air delivery chamber 415*a*, the second air delivery chamber 415*b*, the third air delivery chamber 415*c*, the passage chamber 415*d*, and the discharge chamber 415*e*. At this point, the second outward guiding recess 425 is aligned with the remaining ones of the first air delivery chamber 415*a*, the second air delivery chamber 415*b*, the third air delivery chamber 415*c*, the passage chamber 415*d*, and the discharge chamber 415*e*. Since the turnable pivotal connecting stem 426 and the fixed pivotal connecting stem 413 are pivotally connected to each other, the turnable member 42 can be turned relative to the fixed seat 41 for the first outward guiding recess 424 to selectively align with the first air delivery chamber 415*a*, the second air delivery chamber 415*b*, the third air delivery chamber 415*c*, the passage chamber 415*d*, or the discharge chamber 415*e*.

Please refer to FIGS. 3, 6A, 6B and 6C again. The turning knob 43 of the airflow switching mechanism 40 is connected to the knob coupling block 422 of the turnable member 42 and is projected beyond the knob mounting opening 14 of the enclosure 10 to expose to an external space. The locating unit 44 of the airflow switching mechanism 40 is located between the fixed seat 41 and the turnable member 42 to allow the turnable member 42 to stop at different positions relative to the fixed seat 41. In the illustrated preferred embodiment, the locating unit 44 includes a first to a fourth locating notch 441, 442, 443, 444 and a locating protrusion 445. The first to the third locating notch 441, 442, 443 are provided on the fixed shell 411 of the fixed seat 41 closer to the first air delivery chamber 415*a* and are sequentially arrayed clockwise along an outer periphery of the fixed shell 411, while the fourth locating notch 444 is located on the fixed shell 411 at a position closer to the discharge chamber 415*e*. The locating protrusion 445 is integrally formed with the turnable shell 421 of the turnable member 42 for engaging with one of the first locating notch 441, the second locating notch 442, the third locating notch 443 and the fourth locating notch 444.

Figure 7:
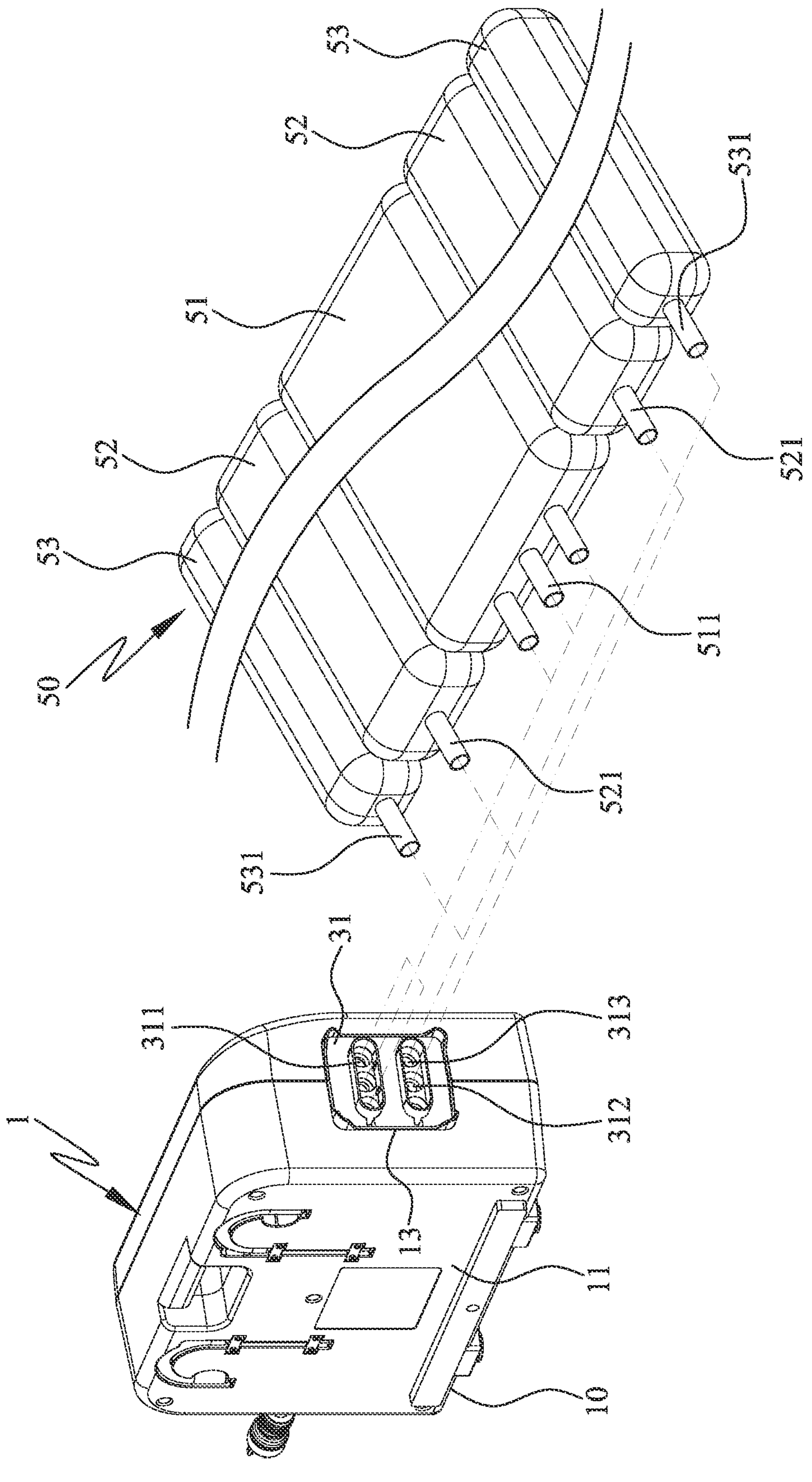
FIG. 7 shows the use of the inflating pump of the present invention to inflate an inflatable air bed.

Please refer to FIG. 7. The inflating pump 1 is designed for use with an inflatable air bed 50. As shown, the inflatable air bed 50 includes a plurality of air bags, which include a first air bag 51 located at a middle of the inflatable air bed 50, and a second and a third air bag 52, 53 located at each of two opposite ends of the first air bag 51 from inner to outer side. That is, the first air bag 51 is located between the two second air bags 52, and each of the second air bags 52 is located between the first air bag 51 and one of the third air bags 53. The first air bag 51 is provided with a plurality of first connecting pipes 511 for connecting to the first air delivery ports 311 of the air delivery pipe assembly 30 in a one-to-one correspondence, such that the first air bag 51 is fluidly communicable with the first air delivery pipe 32 of the air delivery pipe assembly 30. The second air bags 52 are respectively provided with a second connecting pipe 521 for connecting to the second air delivery port 312 of the air delivery pipe assembly 30, such that the second air bags 52 are fluidly communicable with the second air delivery pipe 33 of the air delivery pipe assembly 30. Similarly, the third air bags 53 are respectively provided with a third connecting pipe 531 for connecting to the third air delivery port 313 of the air delivery pipe assembly 30, such that the third air bags 53 are fluidly communicable with the third air delivery pipe 34 of the air delivery pipe assembly 30.

FIGS. 8A to 8E pictorially illustrate the use of the inflating pump 1 to inflate the first air bag 51, the second air bags 52 and the third air bags 53 of the inflatable air bed 50. First, please refer to FIGS. 8A and 8B. When the turning knob 43 of the airflow switching mechanism 40 is turned and the turnable seat 42 of the airflow switching mechanism 40 is brought to turn relative to the fixed member 41 of the airflow switching mechanism 40 for the locating protrusion 445 of the locating unit 44 to engage with the first locating notch 441 of the locating unit 44, the inflating pump 1 is set to a full inflation mode M1. When the inflating pump 1 is in the full inflation mode M1, one of the air-out partition sections 423*b* of the turnable partition 423 is aligned with the first fixed air-out partition 414*a* of the fixed seat 41 while the other air-out partition section 423*b* of the turnable partition 423 is aligned with the fourth fixed air-out partition 414*d* of the fixed seat 41, so that the first, the second and the third air delivery chamber 415*a*, 415*b*, 415*c* of the fixed seat 41 all are communicable with the first outward guiding recess 424 of the turnable member 42. Meanwhile, the passage chamber 415*d* and the discharge chamber 415*e* of the fixed seat 41 are communicable with the second outward guiding recess 425 of the turnable member 42.

Figure 8A:
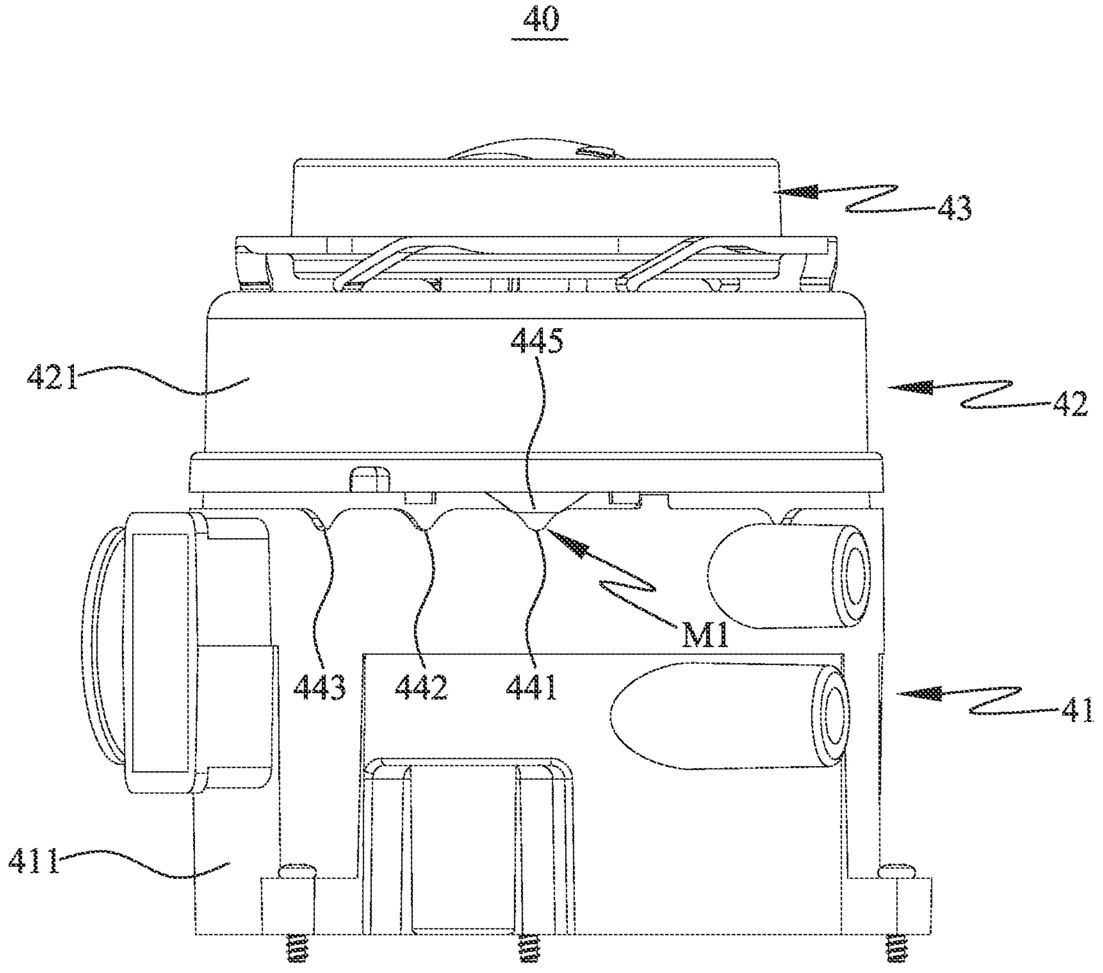
FIG. 8A shows a locating protrusion on the turnable member and a first locating notch on the fixed seat of the airflow switching mechanism are engaged with each other.
Figure 8B:
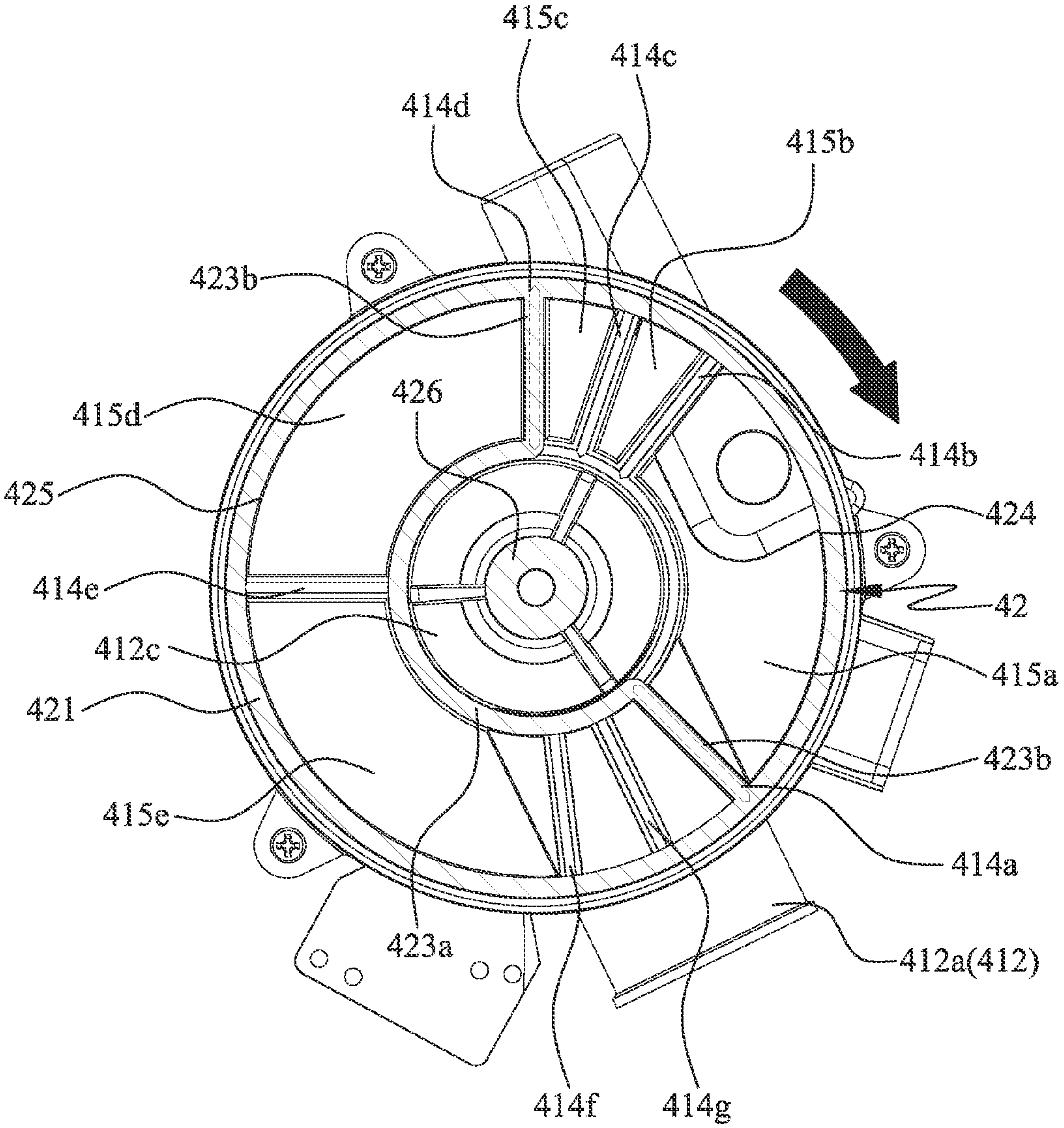
FIG. 8B shows a first outward guiding recess of the turnable member is communicable with first, second and third air delivery chambers of the fixed seat.
Figure 8C:
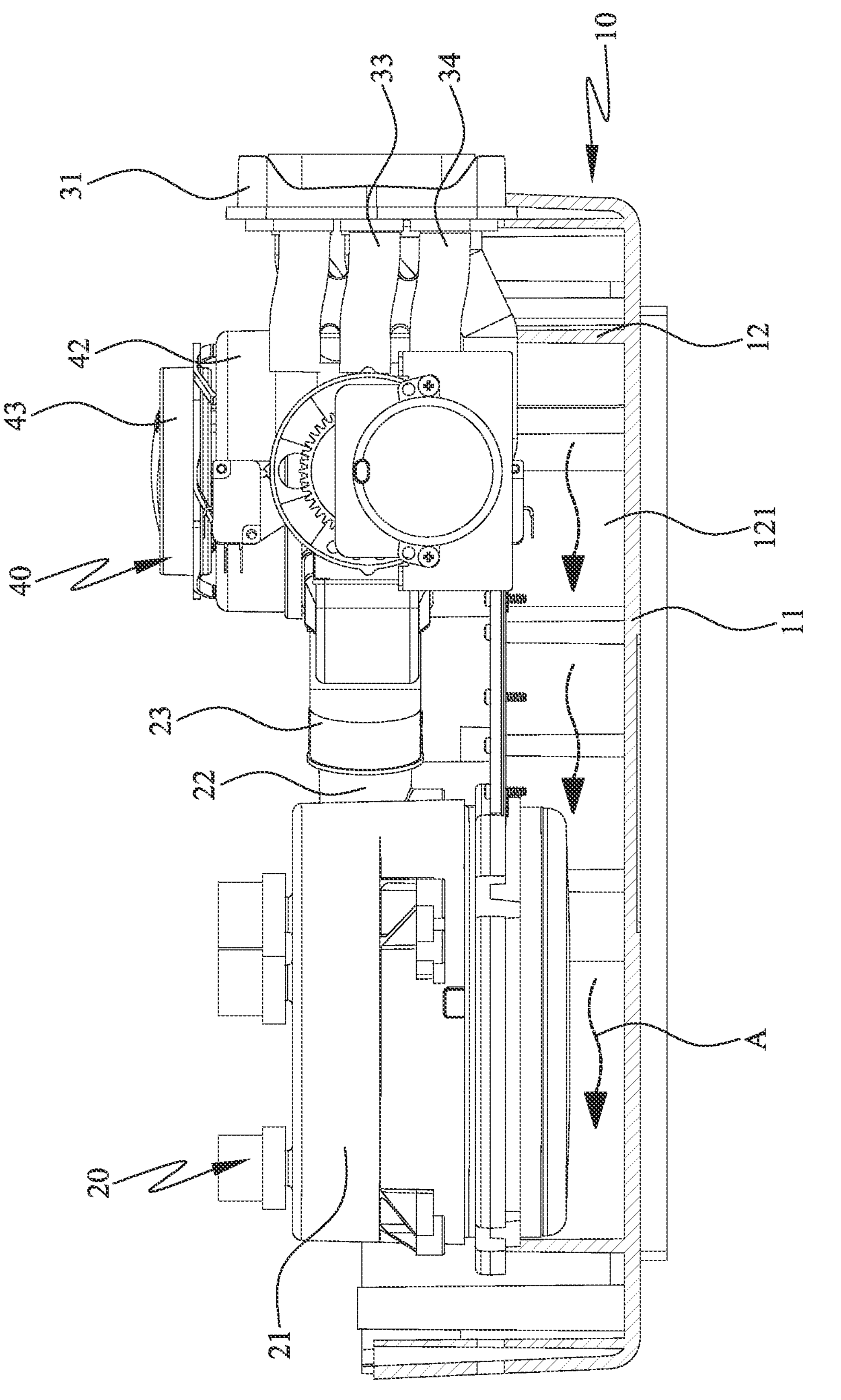
FIG. 8C shows airflow pushed out from an air blower of the inflating pump flows toward an air-in passage.
Figure 8D:
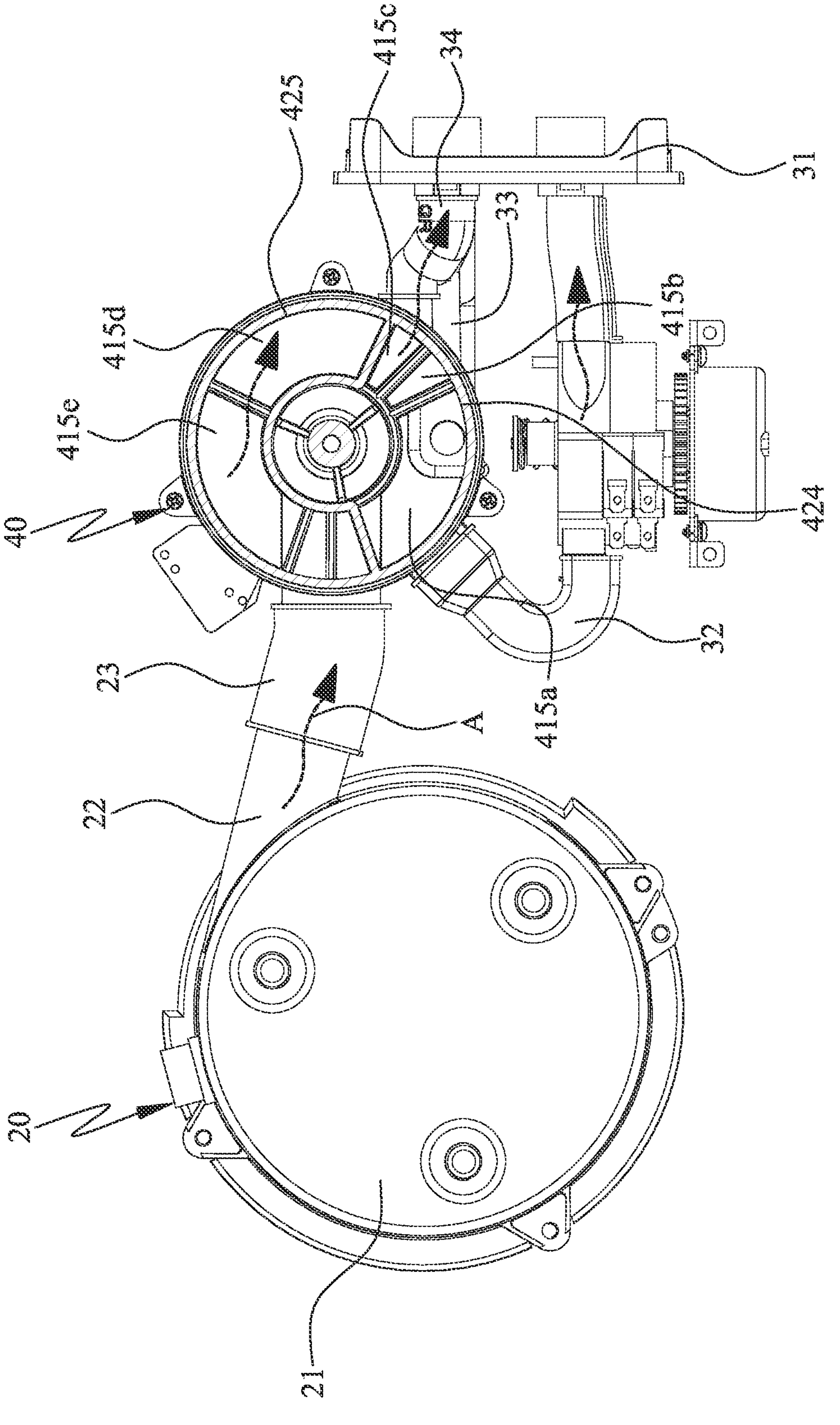
FIG. 8D shows the airflow pushed out from the air blower flows from the air-in passage toward first, second and third air delivery pipes of the air delivery pipe assembly.
Figure 8E:
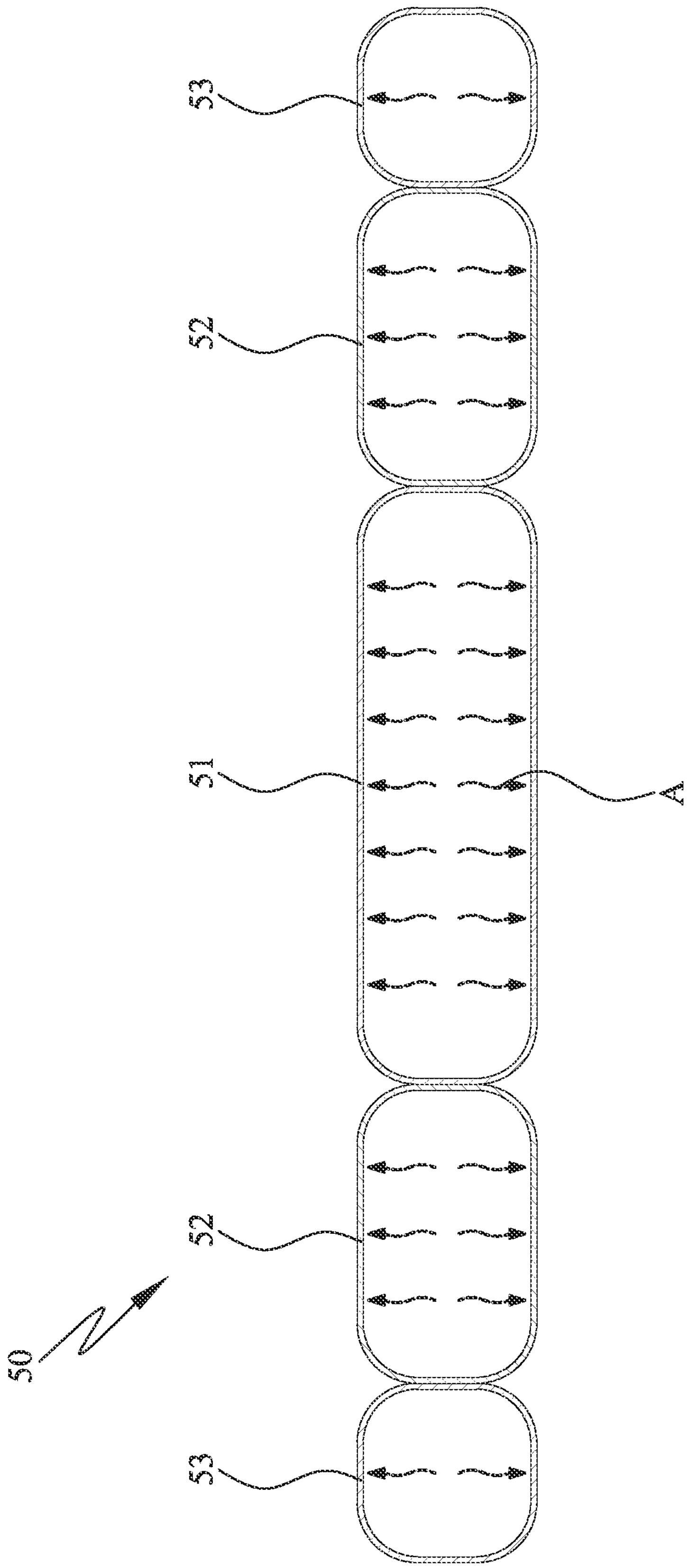
FIG. 8E shows a first, a second and a third air bag of the inflatable air bed are inflated.

Please refer to FIGS. 8C, 8D and 8E. Then, turn on the air blower 20 for the blower main body 21 to operate and draw in air in the enclosing wall 12. The drawn air is then pushed out of the blower main body 21 to form airflow A, which flows through the air-out connection 22 and the air-out pipe 23 of the air blower 20 into the air-in passage 412*c* of the fixed seat 41. Thereafter, the airflow A flows from the air-in passage 412*c* through the first outward guiding recess 424 of the turnable member 42 into the first, the second and the third air delivery chamber 415*a*, 415*b*, 415*c* of the fixed seat 41, so that the airflow A supplied by the air blower 20 flows from the first, the second and the third air delivery chamber 415*a*, 415*b*, 415*c* through the first, the second and the third air delivery pipe 32, 33, 34 of the air delivery pipe assembly 30 into the first air bag 51, the second air bags 52 and the third air bags 53 of the inflatable air bed 50 to inflate all the first, second and third air bags 51, 52, 53. Meanwhile, since the air in the enclosing wall 12 is drawn into the blower main body 21 of the air blower 20, the atmospheric pressure in the discharge space 16 becomes higher than that in the enclosing wall 12. As a result, air in the external environment flows through the communicating holes 15 on the enclosure 10 into the discharge space 16 in the enclosure 10. The air of external environment flowed into the discharge space 16 further flows through the discharge chamber 415*e* of the fixed seat 41, the second outward guiding recess 425 of the turnable member 42, and the passage chamber 415*d* of the fixed seat 41 into the airflow passage 121 in the enclosing wall 12.

FIGS. 9A to 9D pictorially illustrate the use of the inflating pump 1 to inflate the first bag 51 and the second air bags 52 of the inflatable air bed 50 while deflating the third air bags 53 at the same time. First, please refer to FIGS. 9A and 9B. When the turning knob 43 of the airflow switching mechanism 40 is turned clockwise and the turnable member 42 of the airflow switching mechanism 40 is brought to turn clockwise relative to the fixed seat 41 of the airflow switching mechanism 40 for the locating protrusion 445 of the locating unit 44 to move from the first locating notch 441 to the second locating notch 442 and engage with the latter, the inflating pump 1 is set to a first partial inflation mode M2. When the inflating pump 1 is in the first partial inflation mode M2, one of the air-out partition sections 423*b* of the turnable partition 423 is aligned with the third fixed air-out partition 414*c* of the fixed seat 41 while the other air-out partition section 423*b* of the turnable partition 423 is aligned with the seventh fixed air-out partition 414*g* of the fixed seat 41, so that the first and the second air delivery chamber 415*a*, 415*b* of the fixed seat 41 are communicable with the first outward guiding recess 424 of the turnable member 42. Meanwhile, the third air delivery chamber 415*c*, the passage chamber 415*d* and the discharge chamber 415*e* of the fixed seat 41 are communicable with the second outward guiding recess 425 of the turnable member 42.

Figure 9A:
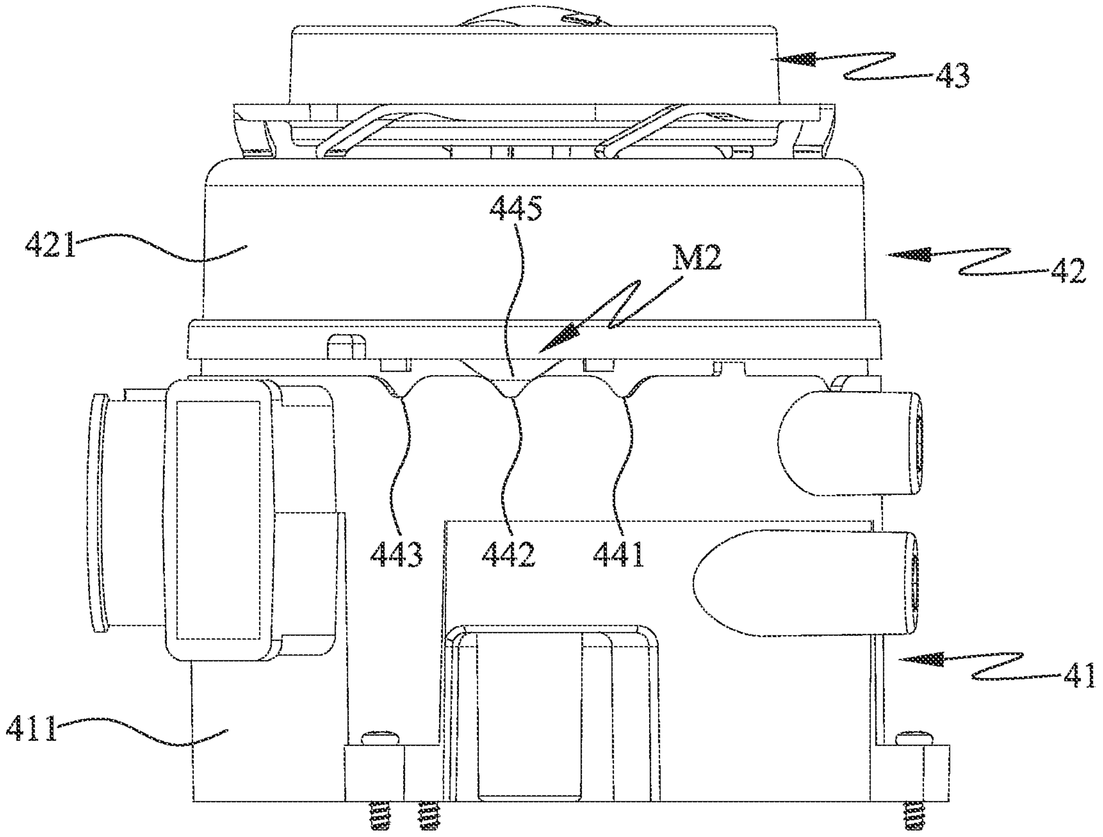
FIG. 9A shows the locating protrusion on the turnable member and a second locating notch on the fixed seat are engaged with each other.
Figure 9B:
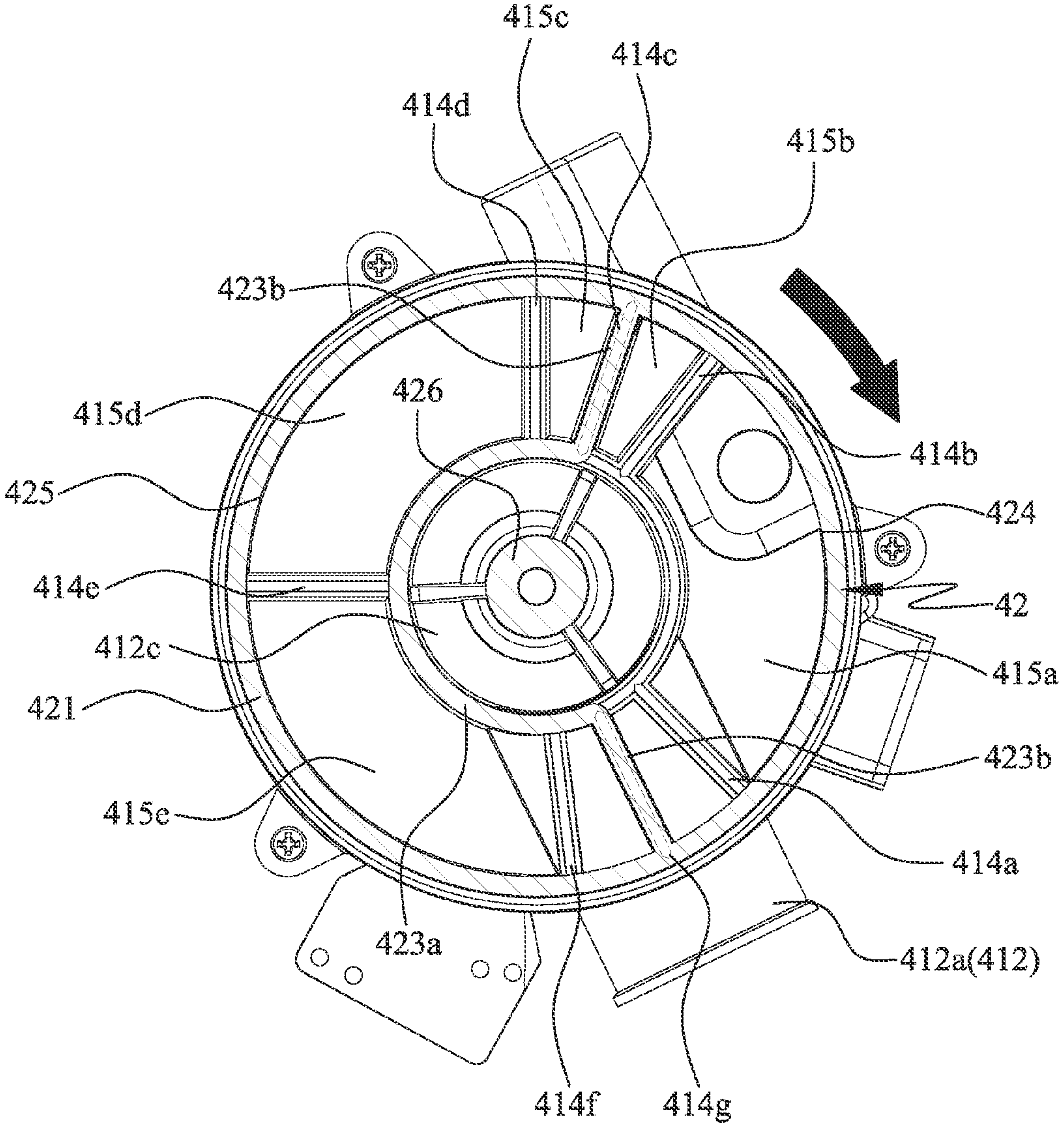
FIG. 9B shows the first outward guiding recess communicates with the first and the second air delivery chamber.
Figure 9C:
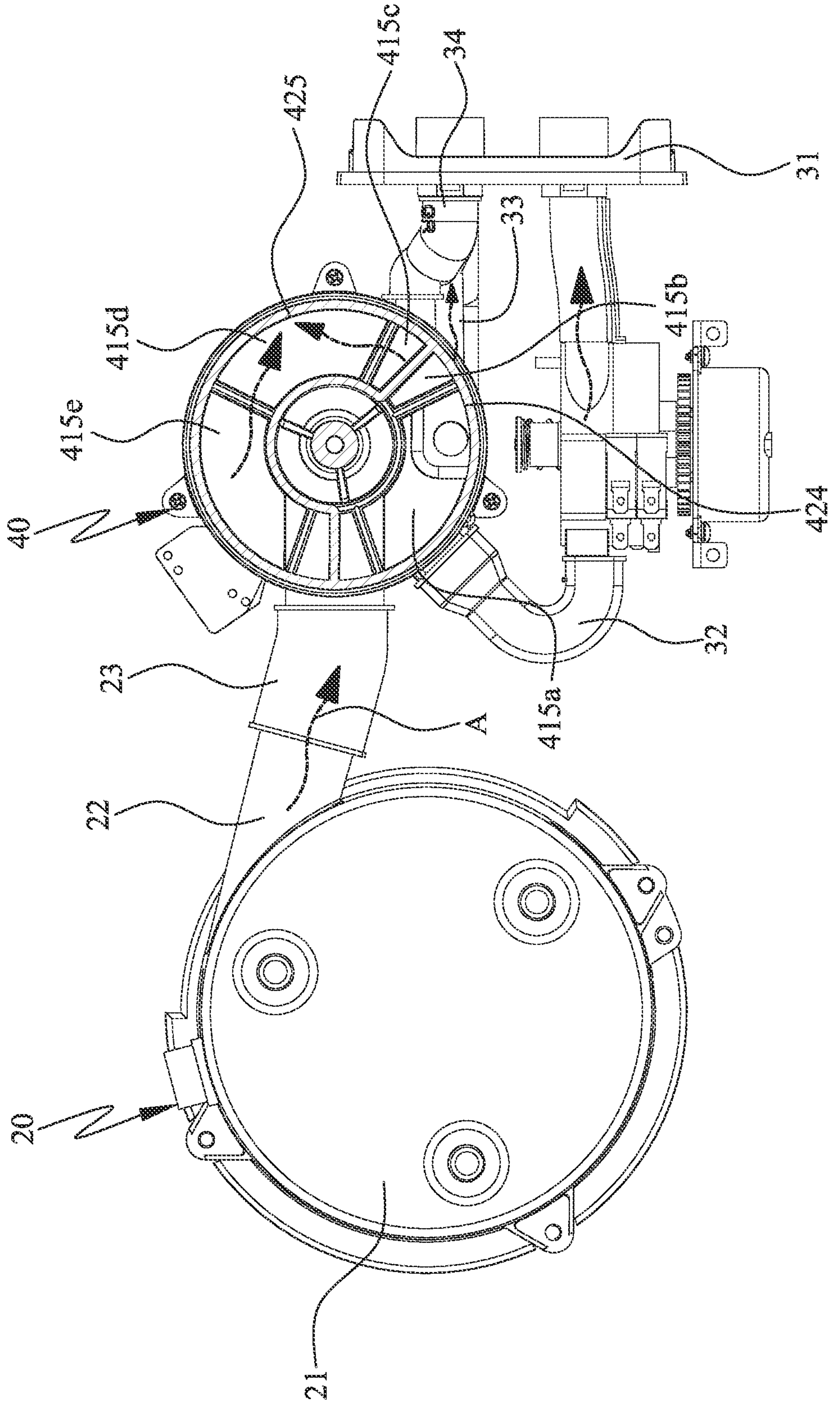
FIG. 9C shows the airflow pushed out from the air blower flows from the air-in passage toward the first and the second air delivery pipe.
Figure 9D:
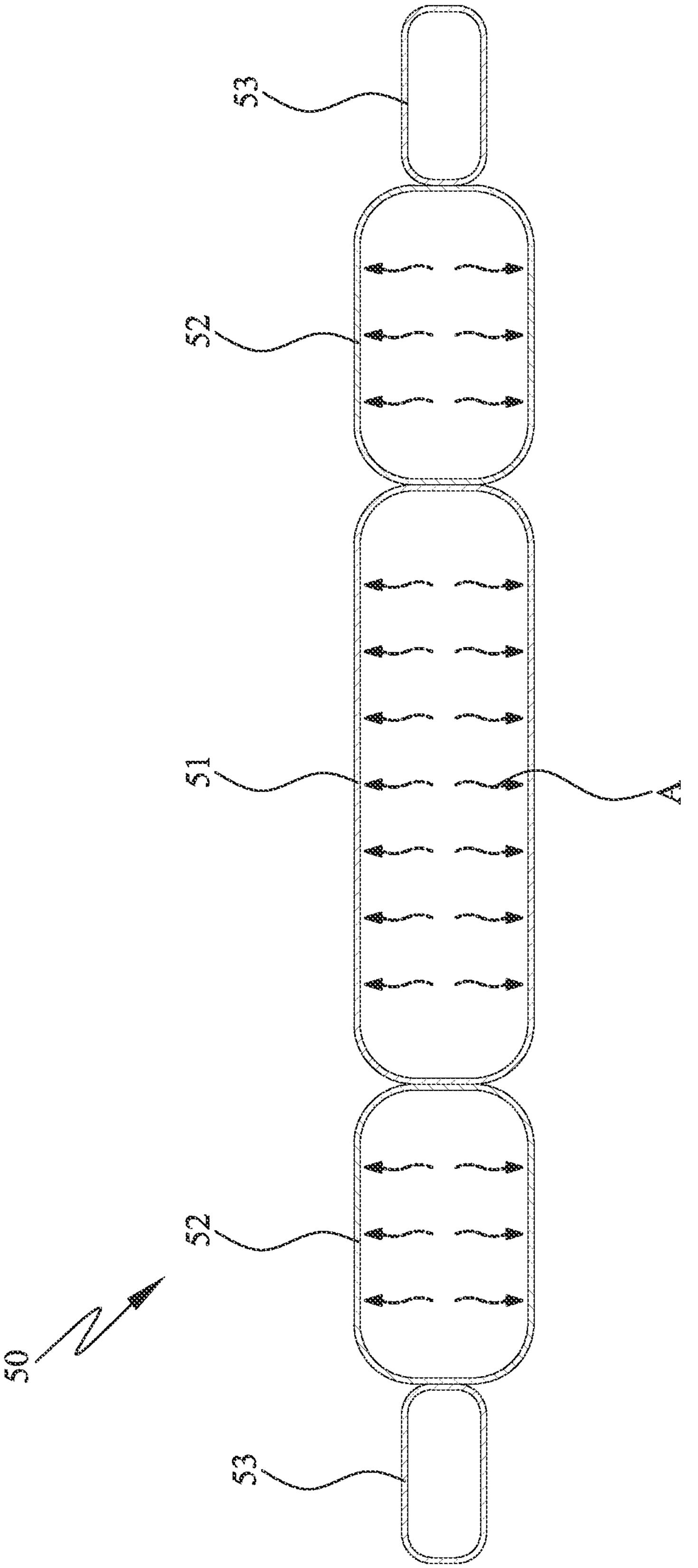
FIG. 9D shows the first air bag and the second air bags of the inflatable air bed are inflated.

Please refer to FIGS. 9C and 9D. Thereafter, let the blower main body 21 of the air blower 20 to operate and draw in air in the enclosing wall 12. The drawn air is then pushed out of the blower main body 21 to form airflow A, which flows through the air-out connection 22 and the air-out pipe 23 of the air blower 20 into the air-in passage 412*c* of the fixed seat 41. Thereafter, the airflow A flows from the air-in passage 412*c* through the first outward guiding recess 424 of the turnable member 42 into the first and the second air delivery chamber 415*a*, 415*b* of the fixed seat 41, so that the airflow A supplied by the air blower 20 flows from the first and the second air delivery chamber 415*a*, 415*b* through the first and the second air delivery pipe 32, 33 of the air delivery pipe assembly 30 into the first air bag 51 and the second air bags 52 of the inflatable air bed 50 to inflate the first and second air bags 51, 52. Meanwhile, air in the external environment flows through the communicating holes 15 on the enclosure 10 into the discharge space 16 in the enclosure 10. The air in the discharge space 16 further flows through the discharge chamber 415*e* of the fixed seat 41, the second outward guiding recess 425 of the turnable member 42 and the passage chamber 415*d* of the fixed seat 41 into the airflow passage 121 of the enclosing wall 12.

In the illustrated preferred embodiment, when the inflating pump 1 is set to the first partial inflation mode M2 for the air blower 20 to inflate the first air bag 51 and the second air bags 52 and the air in the enclosing wall 12 is drawn into the blower main body 21 of the air blower 20, the atmospheric pressure in the third air bags 53 becomes higher than the atmospheric pressure in the third air delivery chamber 415*c*. As a result, air in the third air bags 53 flows through the third air delivery pipe 34 of the air delivery pipe assembly 30 into the airflow passage 121 in the enclosure 10. The air flowed out of the third air bags 53 further flows from the airflow passage 121 to the air blower 20 to achieve the purpose of deflating the third air bags 53.

FIGS. 10A to 10D pictorially illustrate the use of the inflating pump 1 to inflate the first air bag 51 while deflating the second and the third air bags 52, 53 of the inflatable air bed 50. First, please refer to FIGS. 10A and 10B, When the turning knob 43 of the airflow switching mechanism 40 is turned clockwise and the turnable member 42 of the airflow switching mechanism 40 is brought to turn clockwise relative to the fixed seat 41 of the airflow switching mechanism 40 for the locating protrusion 445 of the locating unit 44 to move from the second locating notch 442 to the third locating notch 443 and engage with the latter, the inflating pump 1 is set to a second partial inflation mode M3. When the inflating pump 1 is in the second partial inflation mode M3, one of the air-out partition sections 423*b* of the turnable partition 423 is aligned with the second fixed air-out partition 414*b* of the fixed seat 41 while the other air-out partition section 423*b* of the turnable partition 423 is aligned with the sixth fixed air-out partition 414*f* of the fixed seat 41, so that only the first air delivery chamber 415*a* of the fixed seat 41 is communicable with the first outward guiding recess 424 of the turnable member 42. Meanwhile, the second and the third air delivery chamber 415*b*, 415*c*, the passage chamber 415*d* and the discharge chamber 415*e* of the fixed seat 41 are communicable with the second outward guiding recess 425 of the turnable member 42.

Figure 10A:
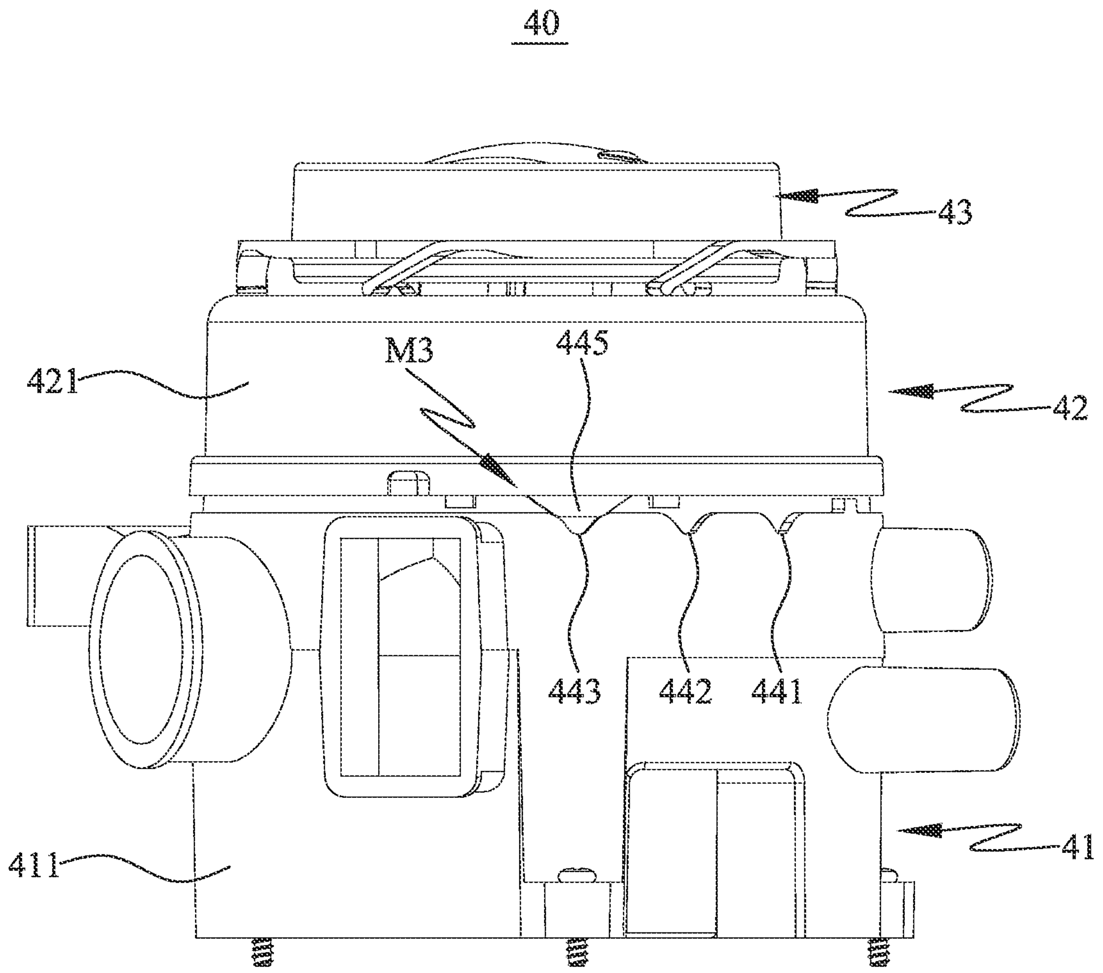
FIG. 10A shows the locating protrusion on the turnable member and a third locating notch on the fixed seat are engaged with each other.
Figure 10B:
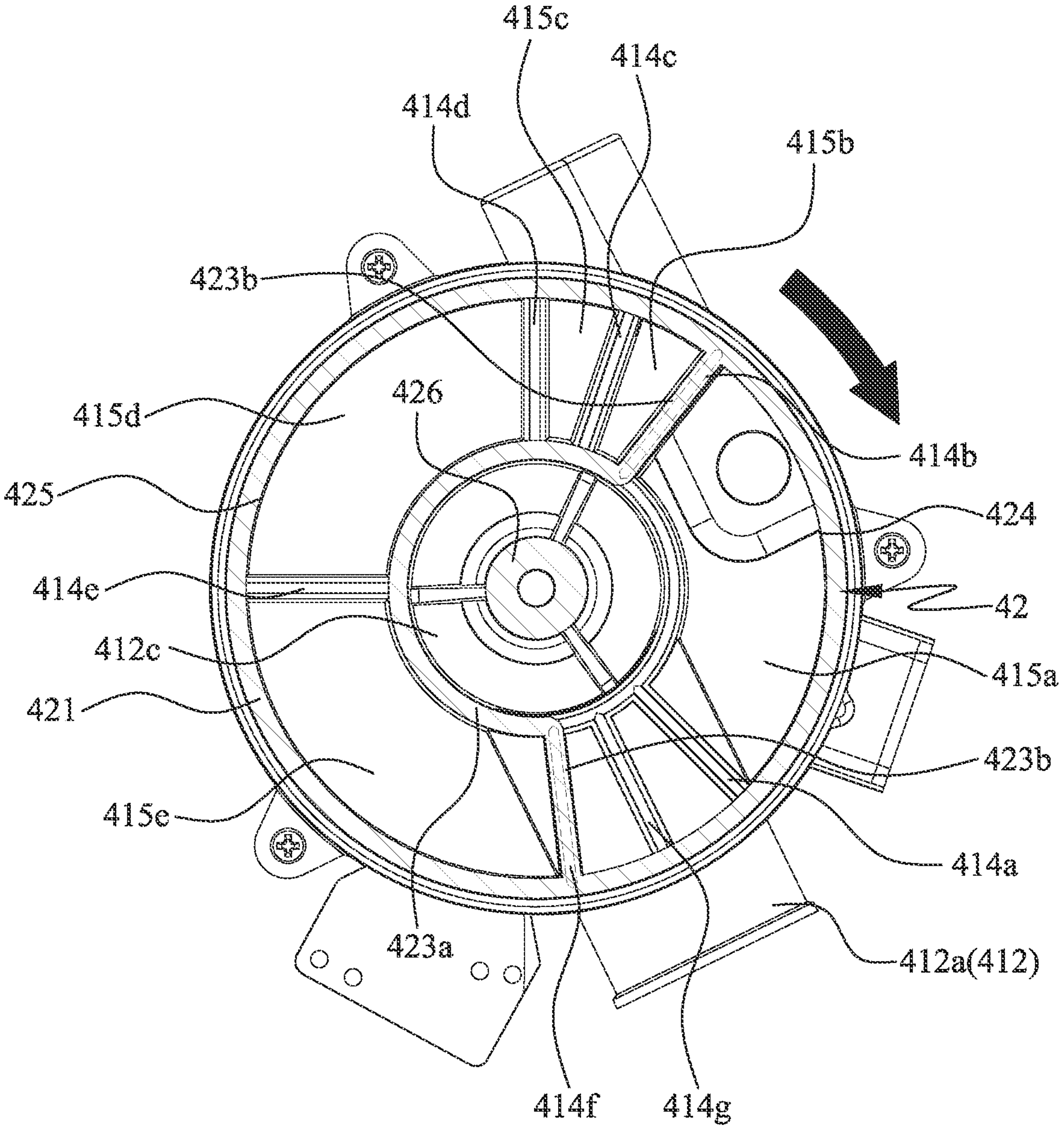
FIG. 10B shows the first outward guiding recess communicates with the first air delivery chamber.
Figure 10C:
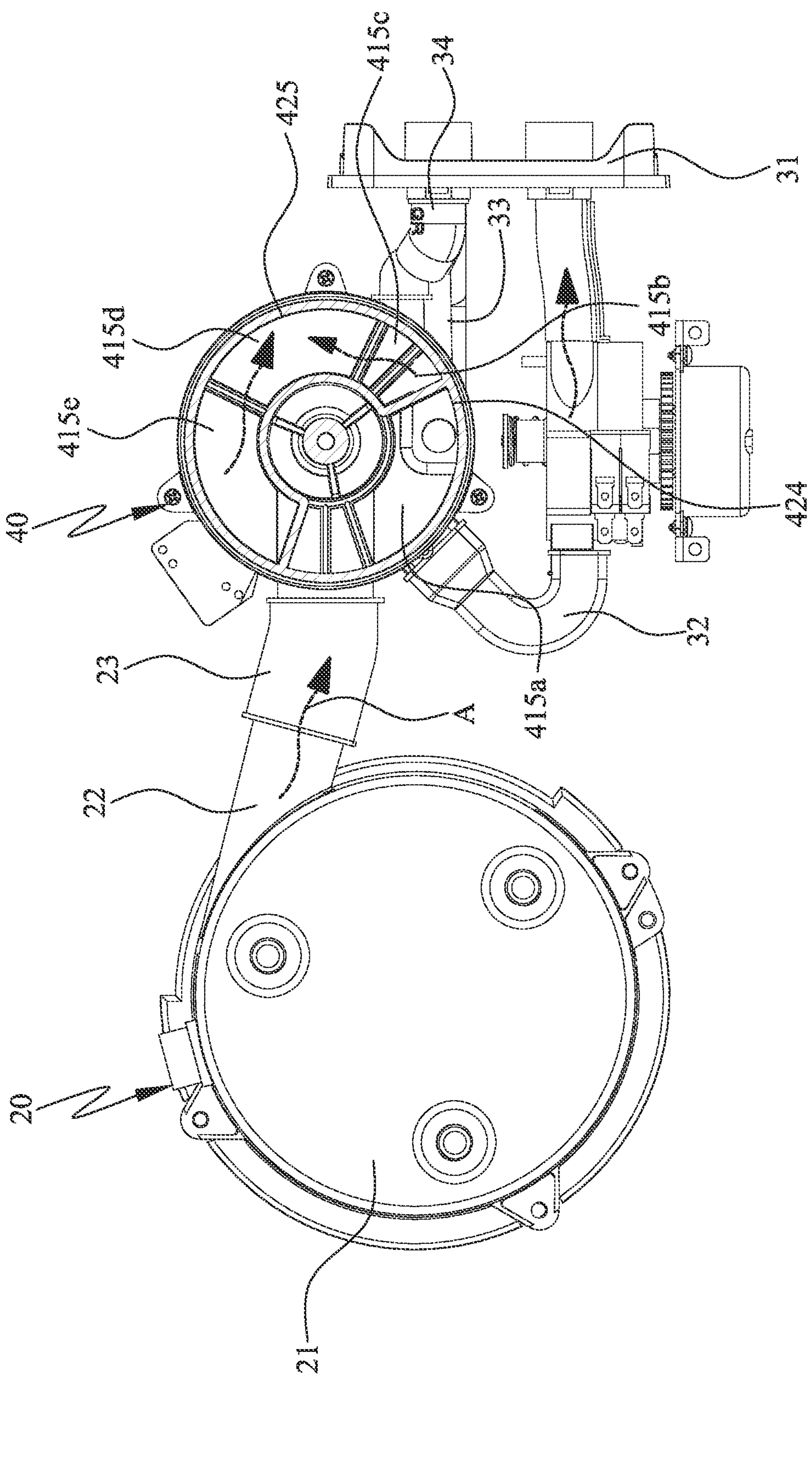
FIG. 10C shows the airflow pushed out from the air blower flows from the air-in passage toward the first air delivery pipe.
Figure 10D:
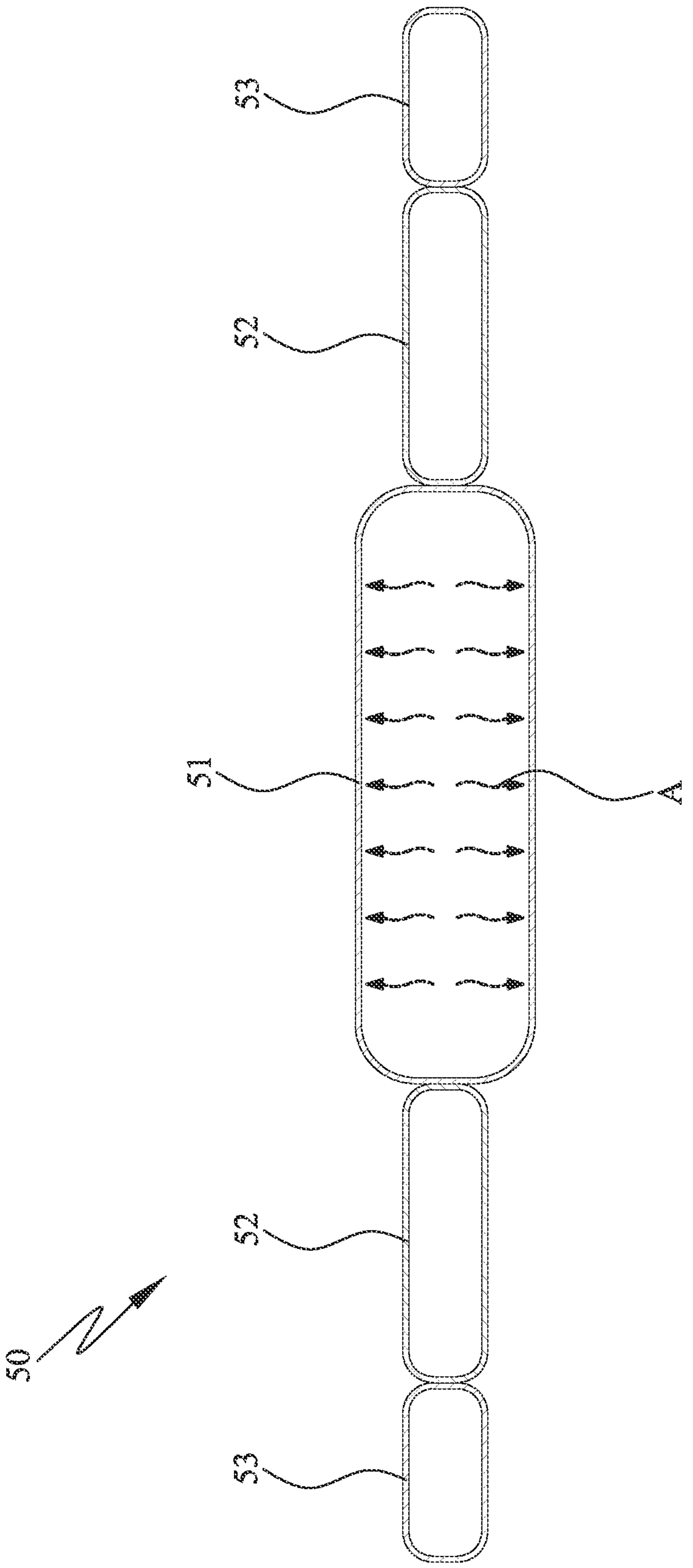
FIG. 10D shows the first air bag of the inflatable air bed is inflated.

Please refer to FIGS. 10C and 10D. When the blower main body 21 of the air blower 20 operates and draws in air in the enclosing wall 12, the drawn air is then pushed out of the blower main body 21 to form airflow A, which flows through the air-out connection 22 of the air blower 20 and the first outward guiding recess 424 of the turnable member 42 into the first air delivery chamber 415*a* of the fixed seat 41, so that the airflow A supplier by the air blower 20 flows from the first air delivery chamber 415*a* through the first air delivery pipe 32 of the air delivery pipe assembly into the first air bag 51 of the inflatable air bed 50 to inflate the first air bag 51. In the illustrated preferred embodiment, when the inflating pump 1 is set to the second partial inflation mode M3 for the air blower 20 to inflate only the first air bag 51 of the inflatable air bed 50 and the air in the enclosing wall 12 is drawn into the blower main body 21 of the air blower 20, the atmospheric pressure in the enclosing wall 12 is reduced. As a result, air in the external environment flows through the communicating holes 15 on the enclosure 10 into the discharge space 16 in the enclosure 10. The airflow flowing from the external environment into the discharge space 16 further flows through the discharge chamber 415*e* of the fixed seat 41, the second outward guiding recess 425 of the turnable member 42, and the passage chamber 415*d* into the airflow passage 121 of the enclosing wall 12. Meanwhile, the air in the second and the third air bags 52, 53 flows through the second and the third air delivery pipe 33, 34 of the air delivery pipe assembly 30 into the airflow passage 121 in the enclosure 10. The air flowed out of the second and the third air bags 52, 53 further flows through the airflow passage 121 to the air blower 20 to achieve the purpose of deflating the second and the third air bags 52, 53.

FIGS. 11A to 11D pictorially illustrate the use of the inflating pump 1 to deflate the first air bag 51, the second air bags 52 and the third air bags 53 of the inflatable air bed 50 at the same time. First, please refer to FIGS. 11A and 11B. When the turning knob 43 of the airflow switching mechanism 40 is turned clockwise and the turnable member 42 of the airflow switching mechanism 40 is brought to turn clockwise relative to the fixed seat 41 for the locating protrusion 445 of the locating unit 44 to move from the third locating notch 443 to the fourth locating notch 444 of the locating unit 44 and align with the fourth locating notch 444, the inflating pump 1 is set to a deflation mode M4. When the inflating pump 1 is in the inflation mode M4, one of the air-out partition sections 423*b* of the turnable partition 423 is aligned with the first fixed air-out partition 414*a* of the fixed seat 41, while the other air-out partition section 423*b* of the turnable partition 423 is aligned with the fifth fixed air-out partition 414*e* of the fixed seat 41, so that only the discharge chamber 425*e* of the fixed seat 41 is communicable with the first outward guiding recess 424 of the turnable member 42. Meanwhile, the first, the second and the third air delivery chamber 415*a*, 415*b*, 415*c* and the passage chamber 415*d* of the fixed seat 41 are communicable with the second outward guiding recess 425 of the turnable member 42.

Figure 11A:
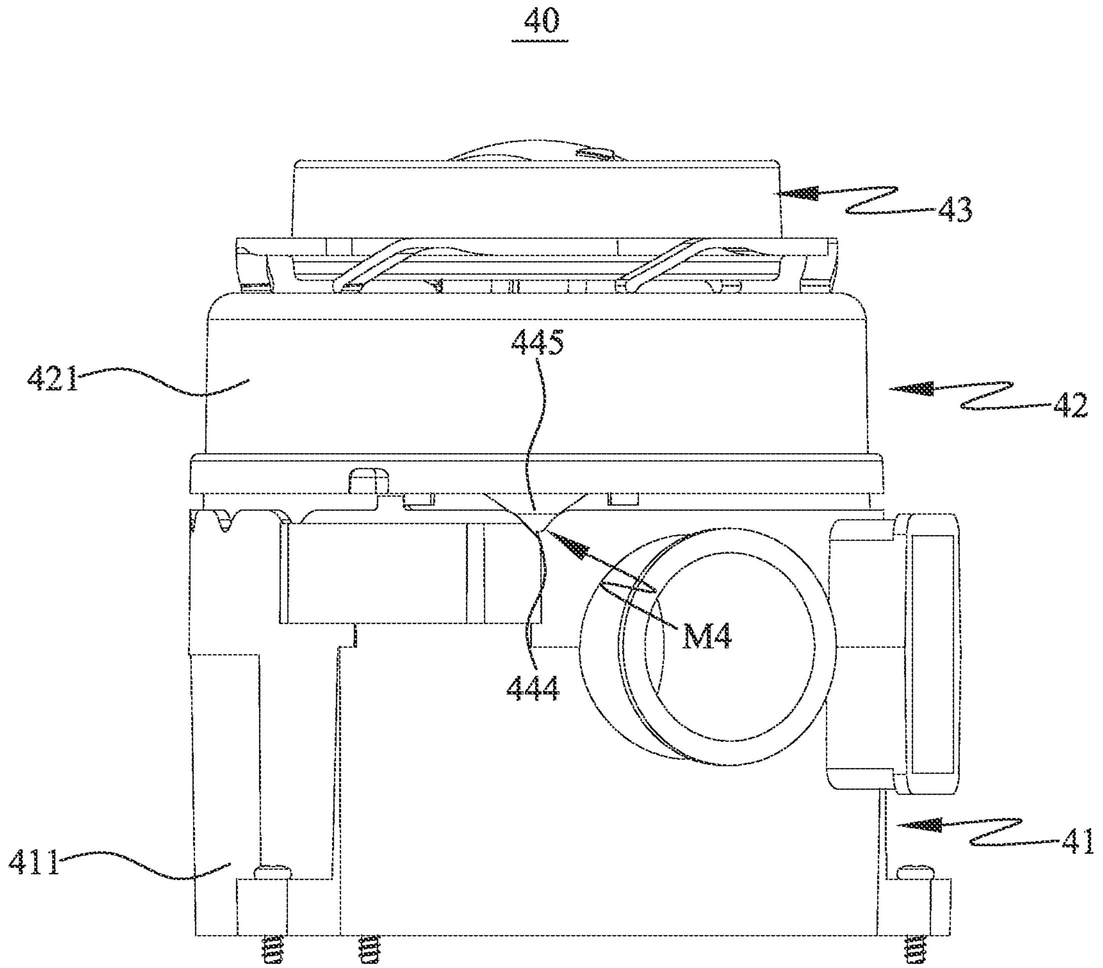
FIG. 11A shows the locating protrusion on the turnable member and a fourth locating notch on the fixed seat are engaged with each other.
Figure 11B:
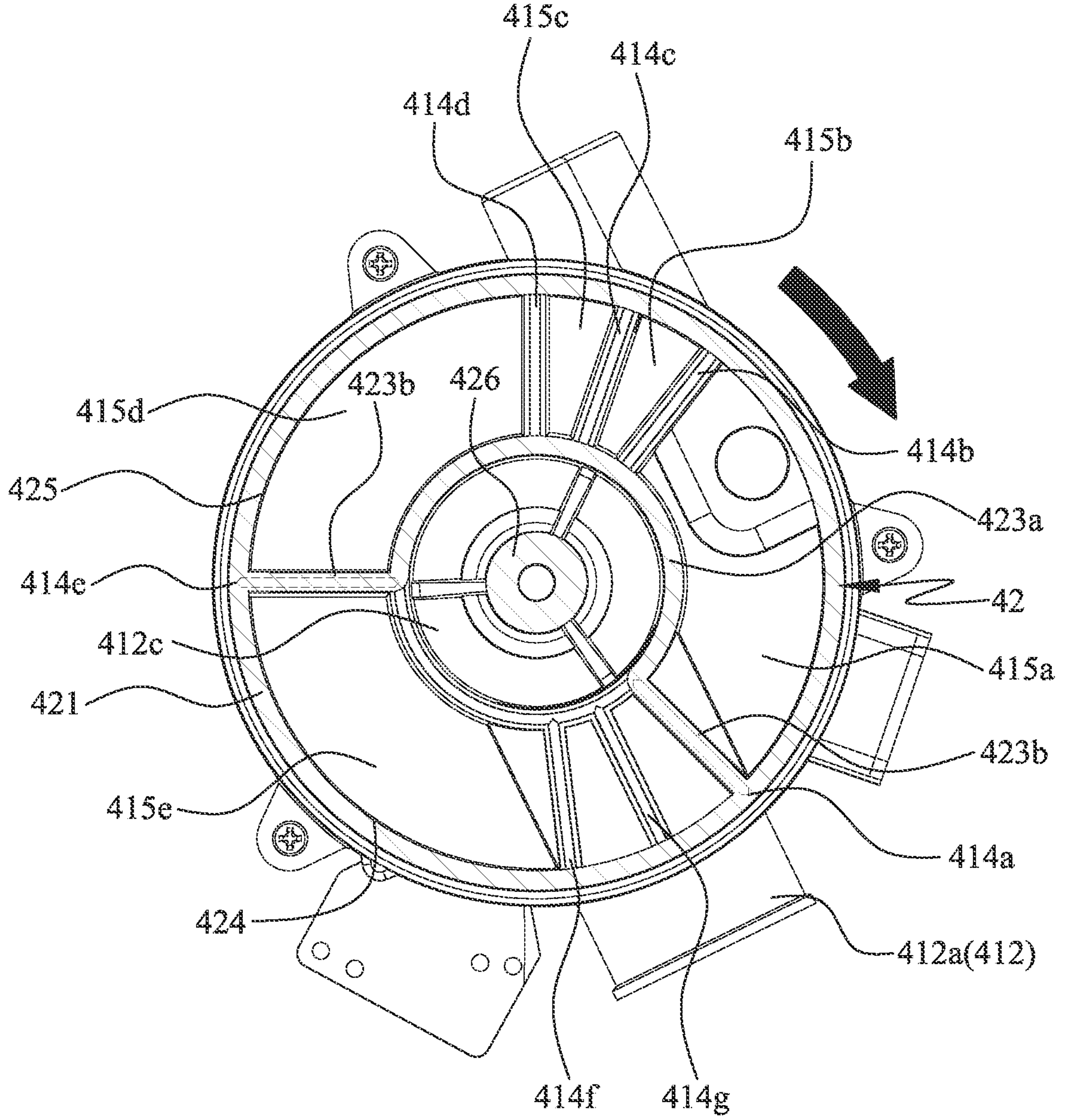
FIG. 11B shows the first outward guiding recess communicates with a discharge chamber on the fixed seat.
Figure 11C:
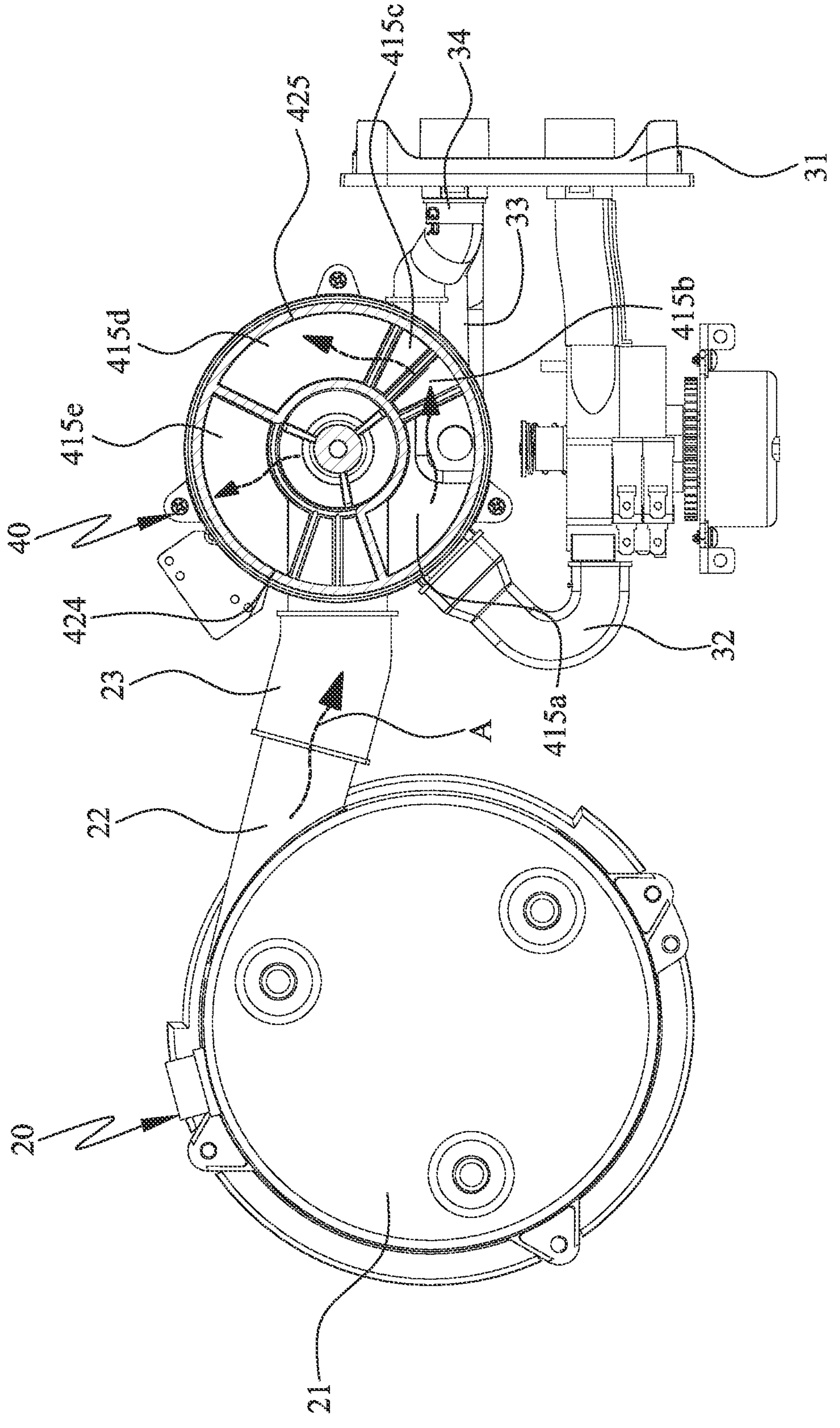
FIG. 11C shows the airflow pushed out from the air blower flows from the air passage toward the discharge chamber.
Figure 11D:
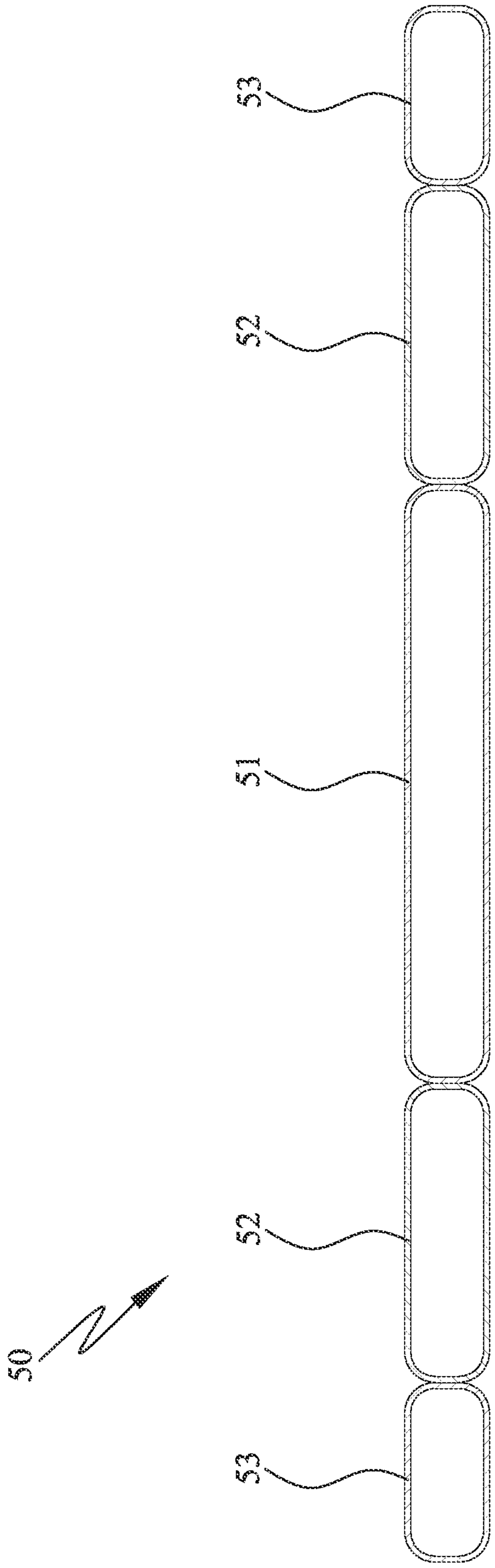
FIG. 11D shows the first air bag, the second air bags and the third air bags of the inflatable air bed are deflated.

Please refer to FIGS. 11C and 11D. Thereafter, let the blower main body 21 of the air blower 20 to operate and draw in the air in the enclosing wall 12. The drawn air is then pushed out of the blower main body 21 to form airflow A, which flows through the air-out connection 22 and the first outward guiding recess 424 of the turnable member 42 into the discharge chamber 415*e* of the fixed seat 41, so that the airflow A supplied by the air blower 20 flows into the discharge space 16 in the enclosure 10. The airflow A flowed into the discharge space 16 further flows through the communicating holes 15 on the enclosure 10 into the external environment. In the illustrated preferred embodiment, when the inflating pump 1 is set to the deflation mode M4 for the air blower 20 to discharge the airflow A into the discharge space 16, the air in the enclosing wall 12 is drawn into the blower main body 21 of the air blower 20 and the atmospheric pressure in the enclosing wall 12 is reduced. As a result, the air in the first air bag 51, the second air bags 52 and the third air bags 53 flows through the first, the second and the third air delivery pipe 32, 33, 34 of the air delivery pipe assembly 30 into the airflow passage 121 in the enclosure 10. The air flowing to the airflow passage 121 further flows to the air blower 20 to achieve the purpose of deflating the first air bag 51, the second air bags 52 and the third air bags 53 at the same time.

The present invention has been described with a preferred embodiment thereof and it is understood that many changes and modifications in the described embodiment can be carried out without departing from the scope and the spirit of the invention that is intended to be limited only by the appended claims.

What is claimed is:

1. An inflating pump for inflating and deflating an inflatable air bed having a first and a second air bag, comprising:

an enclosure including an exterior shell and an enclosing wall located in the exterior shell; the exterior shell internally defines a hollow space, and a discharge space is formed between the exterior shell and the enclosing wall; and an airflow passage is formed inside the enclosing wall;

an airflow switching mechanism located in the enclosure and including:

a fixed seat having an air-in passage, a first air delivery chamber, a second air delivery chamber, a discharge chamber and a passage chamber, which are not communicable with one another; the discharge chamber being communicable with the discharge space; and the passage chamber being communicable with the airflow passage; and a turnable member being pivotally connected to the fixed seat and having a first outward guiding recess and a second outward guiding recess that are not communicable with each other; the first outward guiding recess being communicable with the air-in passage and being selectively aligned with at least one of the first air delivery chamber, the second air delivery chamber, the discharge chamber and the passage chamber; and the second outward guiding recess being aligned with remaining ones of the first air delivery chamber, the second air delivery chamber, the discharge chamber and the passage chamber that are not aligned with the first outward guiding recess;

an air blower being connected to between the enclosing wall and the air-in passage for pushing out airflow into the air-in passage; and an air delivery pipe assembly including a first air delivery pipe for connecting to the first air bag and a second air delivery pipe for connecting to the second air bag; the first air delivery pipe being communicable with the first air delivery chamber, and the second air delivery pipe being communicable with the second air delivery chamber; and wherein, the turnable member is turnable relative to the fixed seat for the airflow to selectively flow from the air-in passage into at least one of the first air delivery chamber, the second air delivery chamber, the discharge chamber and the passage chamber, such that the inflating pump can be switched among a full inflation mode, a partial inflation mode and a deflation mode;

wherein, in the full inflation mode, the first outward guiding recess is communicable with the first air delivery chamber and the second air delivery chamber while the second outward guiding recess is communicable with the discharge chamber and the passage chamber, such that the airflow supplied from the air blower flows through the first air delivery pipe and the second air delivery pipe into the first air bag and the second air bag, respectively;

wherein, in the partial inflation mode, the first outward guiding recess is communicable with the first air delivery chamber while the second outward guiding recess is communicable with the second air delivery chamber, the discharge chamber and the passage chamber, such that the airflow supplied from the air blower can flow through the first air delivery pipe into the first air bag; and wherein, in the deflation mode, the first outward guiding recess is communicable with the discharge chamber while the second outward guiding recess is communicable with the first air delivery chamber, the second air delivery chamber and the passage chamber, such that the airflow supplied from the air blower flows to the discharge space and the air in the first and the second bag flows through the airflow passage into the air blower.

2. The inflating pump as claimed in claim 1, wherein, in the partial inflation mode, the air in the second air bag can flow through the second air delivery pipe into the airflow passage, and the airflow flows from the second air bag to the airflow passage can further flow into the air blower.

3. The inflating pump as claimed in claim 1, wherein the airflow switching mechanism further includes a locating unit provided between the fixed seat and the turnable member for the turnable member to stay at different positions relative to the fixed seat, such that the inflating pump can be set to one of the full inflation mode, the partial inflation mode and the deflation mode.

4. The inflating pump as claimed in claim 3, wherein the locating unit includes a locating protrusion provided on one of the fixed seat and the turnable member and a plurality of locating notches provided on the other one of the fixed seat and the turnable member; and the locating protrusion being detachably engaged with one of the locating notches.

5. The inflating pump as claimed in claim 1, wherein the fixed seat further includes a fixed air-in pipe formed around the air-in passage, and a plurality of fixed air-out partitions circumferentially spaced on the fixed air-in pipe; any two adjacent ones of the first air delivery chamber, the second air delivery chamber, the discharge chamber and the passage chamber having one of the fixed air-out partitions located therebetween; and the fixed air-in pipe and the fixed air-out partitions together preventing the airflow from flowing from the air-in passage directly into any one of the first air delivery chamber, the second air delivery chamber, the discharge chamber and the passage chamber.

6. The inflating pump as claimed in claim 5, wherein the turnable member further includes a turnable partition located between the first outward guiding recess and the second outward guiding recess for preventing the airflow from flowing from the first outward guiding recess into the second outward guiding recess; and the turnable partition including an air-in partition section aligned with the fixed air-in pipe and two air-out partition sections oppositely extended from the air-in partition section; and wherein when the inflating pump is switched to one of the full inflation mode, the partial inflation mode and the deflation mode, each of the air-out partition sections is aligned with one of the fixed air-out partitions in a one-to-one correspondence.

7. The inflating pump as claimed in claim 1, wherein the airflow pushed out from the air blower can only flow into the air-in passage.

* * * * *